United States Patent
Julien et al.

(10) Patent No.: US 10,253,726 B2
(45) Date of Patent: Apr. 9, 2019

(54) ENGINE ASSEMBLY WITH COMBINED ENGINE AND COOLING EXHAUST

(71) Applicant: PRATT & WHITNEY CANADA CORP., Longueuil (CA)

(72) Inventors: Andre Julien, Ste-Julie (CA); Jean Thomassin, Ste-Julie (CA); Maxime Courtois, Longueuil (CA); Bruno Villeneuve, Boucherville (CA); Serge Dussault, Ste-Julie (CA); Richard Ullyott, St-Bruno (CA); Serge LaFortune, Mascouche (CA); Luc Dionne, Candiac (CA); Anthony Jones, San Diego, CA (US); Behzad Hagshenas, San Diego, CA (US); David Menheere, Norval (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 275 days.

(21) Appl. No.: 15/227,519

(22) Filed: Aug. 3, 2016

(65) Prior Publication Data
US 2017/0226959 A1    Aug. 10, 2017

Related U.S. Application Data

(60) Provisional application No. 62/202,275, filed on Aug. 7, 2015.

(51) Int. Cl.
*F02K 1/38*       (2006.01)
*F01P 5/02*       (2006.01)
(Continued)

(52) U.S. Cl.
CPC .............. *F02K 1/386* (2013.01); *B64D 41/00* (2013.01); *F01C 1/22* (2013.01); *F01C 21/18* (2013.01);
(Continued)

(58) Field of Classification Search
CPC .. F02K 1/386; F02K 1/82; F02B 53/02; F02B 63/04; F02B 2053/005; F01P 11/10;
(Continued)

(56) References Cited

U.S. PATENT DOCUMENTS 2,164,545 A   7/1939  Rogers
4,815,282 A   3/1989  Wilkinson et al.
(Continued)

FOREIGN PATENT DOCUMENTS

CN   102673793   9/2012
FR    864010    4/1941
(Continued)

*Primary Examiner* — Hoang M Nguyen
(74) *Attorney, Agent, or Firm* — Norton Rose Fulbright Canada LLP

(57) ABSTRACT

An engine assembly for an aircraft, including an internal combustion engine having a liquid coolant system in fluid communication with a heat exchanger, an exhaust duct in fluid communication with air passages of the heat exchanger, a fan in fluid communication with the exhaust duct for driving a cooling air flow through the air passages of the heat exchanger and into the exhaust duct, and an intermediate duct in fluid communication with an exhaust of the engine and having an outlet positioned within the exhaust duct downstream of the fan and upstream of the outlet of the exhaust duct. The outlet of the intermediate duct is spaced inwardly from a peripheral wall of the exhaust duct. The engine assembly may be configured as an auxiliary power unit. A method of discharging air and exhaust gases in an auxiliary power unit having an internal combustion engine is also discussed.

23 Claims, 16 Drawing Sheets

(51) Int. Cl.
| | | |
|---|---|---|
| *F02B 53/02* | (2006.01) | |
| *F01C 21/18* | (2006.01) | |
| *F02C 7/14* | (2006.01) | |
| *B64D 41/00* | (2006.01) | |
| *F01C 1/22* | (2006.01) | |
| *F02K 5/00* | (2006.01) | |
| *F02C 5/00* | (2006.01) | |
| *F02C 7/18* | (2006.01) | |
| *F02B 63/04* | (2006.01) | |
| *F02B 63/06* | (2006.01) | |
| *F02B 67/04* | (2006.01) | |
| *F01N 3/05* | (2006.01) | |
| *F01P 11/10* | (2006.01) | |
| *F02K 1/82* | (2006.01) | |
| *F02B 53/00* | (2006.01) | |

(52) U.S. Cl.
CPC ............... *F01N 3/05* (2013.01); *F01P 5/02* (2013.01); *F01P 11/10* (2013.01); *F02B 53/02* (2013.01); *F02B 63/04* (2013.01); *F02B 63/06* (2013.01); *F02B 67/04* (2013.01); *F02C 5/00* (2013.01); *F02C 7/14* (2013.01); *F02C 7/18* (2013.01); *F02K 1/82* (2013.01); *F02K 5/00* (2013.01); *B64D 2041/002* (2013.01); *F02B 2053/005* (2013.01); *F05D 2220/50* (2013.01); *F05D 2260/213* (2013.01); *F05D 2300/173* (2013.01); *F05D 2300/43* (2013.01); *F05D 2300/603* (2013.01); *Y02T 10/17* (2013.01); *Y02T 50/53* (2013.01); *Y02T 50/672* (2013.01); *Y02T 50/676* (2013.01)

(58) Field of Classification Search
CPC ........ F01P 5/02; F01N 3/05; F05D 2260/213; F05D 2300/173; F05D 2300/603; F05D 2300/43
USPC ...... 60/39.83, 39.08; 244/53 R, 53 B, 57, 58
See application file for complete search history.

(56) References Cited

U.S. PATENT DOCUMENTS

| | | | |
|---|---|---|---|
| 5,012,646 A | 2/1991 | Speer | |
| 5,265,408 A * | 11/1993 | Sheoran | B64D 33/08 60/262 |
| 5,284,012 A | 2/1994 | Laborie et al. | |
| 5,528,901 A | 6/1996 | Willis | |
| 5,655,359 A * | 8/1997 | Campbell | B64D 33/02 244/58 |
| 5,692,372 A | 12/1997 | Whurr | |
| 5,730,089 A | 3/1998 | Morikawa | |
| 5,987,877 A | 11/1999 | Steiner | |
| 6,092,360 A * | 7/2000 | Hoag | B64D 33/08 244/58 |
| 6,282,881 B1 | 9/2001 | Beutin et al. | |
| 6,430,931 B1 | 8/2002 | Horner | |
| 6,606,854 B1 | 8/2003 | Siefker et al. | |
| 6,615,576 B2 | 9/2003 | Sheoran et al. | |
| 6,651,929 B2 | 11/2003 | Dionne | |
| 6,668,553 B1 | 12/2003 | Ghizawi | |
| 6,786,036 B2 | 9/2004 | Kight | |
| 7,231,767 B2 | 6/2007 | Whiting | |
| 7,337,605 B2 | 3/2008 | Hagshenas | |
| 7,412,831 B2 | 8/2008 | Ullyott | |
| 7,698,896 B2 | 4/2010 | Sheoran et al. | |
| 7,753,036 B2 | 7/2010 | Lents et al. | |
| 7,836,680 B2 | 11/2010 | Schwarz et al. | |
| 8,480,460 B2 | 7/2013 | Schwarz | |
| 9,027,345 B2 | 5/2015 | Julien | |
| 9,771,165 B2 | 9/2017 | Ullyott et al. | |
| 2003/0074895 A1 | 4/2003 | McFarland | |
| 2003/0080244 A1 | 5/2003 | Dionne | |
| 2005/0268593 A1 | 12/2005 | Hagshenas | |
| 2006/0016196 A1 | 1/2006 | Epstein | |
| 2006/0016197 A1 | 1/2006 | Epstein | |
| 2007/0145745 A1 | 6/2007 | Woods et al. | |
| 2007/0240415 A1* | 10/2007 | Julien | F02C 3/055 60/614 |
| 2008/0277533 A1 | 11/2008 | Schwartz et al. | |
| 2008/0314573 A1 | 12/2008 | Schwartz et al. | |
| 2009/0007882 A1 | 1/2009 | Lents et al. | |
| 2009/0078496 A1 | 3/2009 | Francisco | |
| 2009/0088063 A1 | 4/2009 | Schwarz | |
| 2009/0159246 A1 | 6/2009 | Cornet et al. | |
| 2013/0214091 A1 | 8/2013 | Hillel | |
| 2014/0020380 A1 | 1/2014 | Thomassin | |
| 2014/0159378 A1 | 6/2014 | Wright | |
| 2014/0360445 A1 | 12/2014 | Reynolds et al. | |
| 2015/0083367 A1 | 3/2015 | Diaz et al. | |
| 2015/0233286 A1 | 8/2015 | Julien | |
| 2015/0267555 A1 | 9/2015 | Plante et al. | |
| 2015/0349356 A1 | 12/2015 | Ribarov et al. | |
| 2016/0376022 A1 | 12/2016 | Ullyott et al. | |
| 2016/0376981 A1 | 12/2016 | Ullyott et al. | |
| 2017/0036775 A1 | 2/2017 | Jones et al. | |
| 2017/0037756 A1* | 2/2017 | Julien | B64D 27/10 |
| 2017/0037775 A1 | 2/2017 | Jones et al. | |
| 2017/0037776 A1* | 2/2017 | Jones | F02B 53/14 |
| 2017/0226959 A1 | 8/2017 | Julien et al. | |
| 2017/0267370 A1 | 9/2017 | Ullyott et al. | |
| 2018/0091032 A1 | 3/2018 | Williams | |

FOREIGN PATENT DOCUMENTS

| | | |
|---|---|---|
| GB | 622768 | 5/1949 |
| GB | 622768 A | 5/1949 |
| JP | 06107295 | 4/1994 |
| WO | 8910300 | 11/1989 |
| WO | 03037715 | 5/2003 |

* cited by examiner

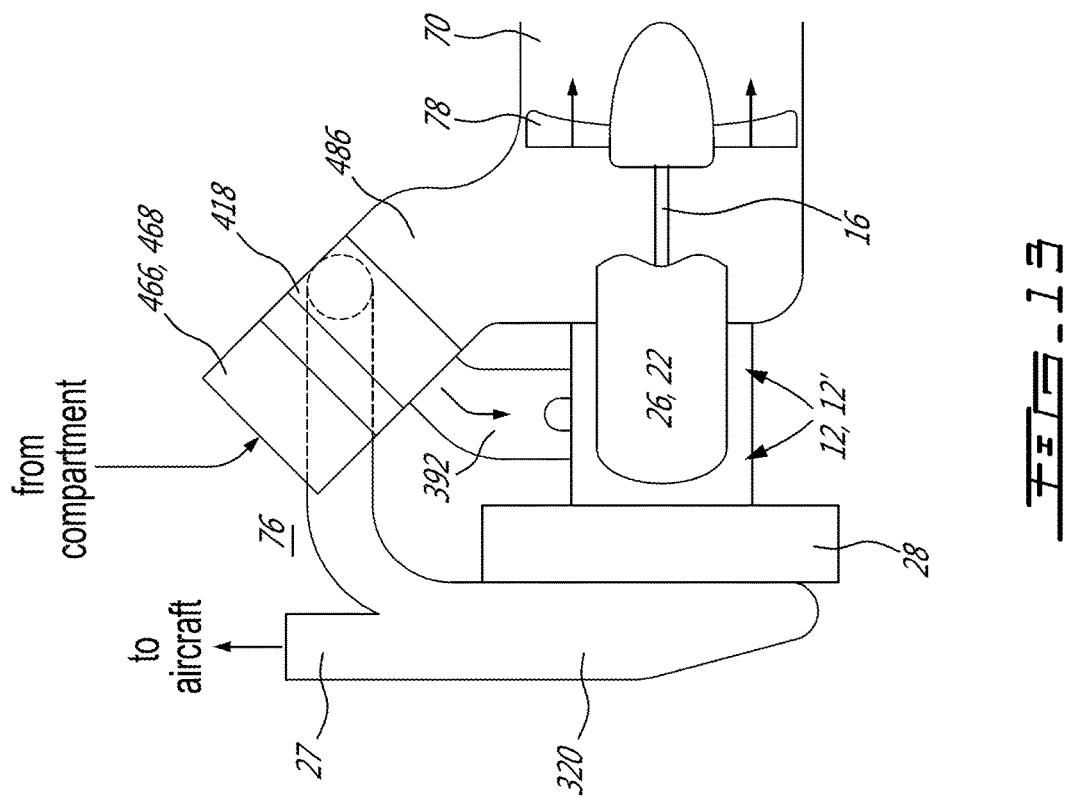

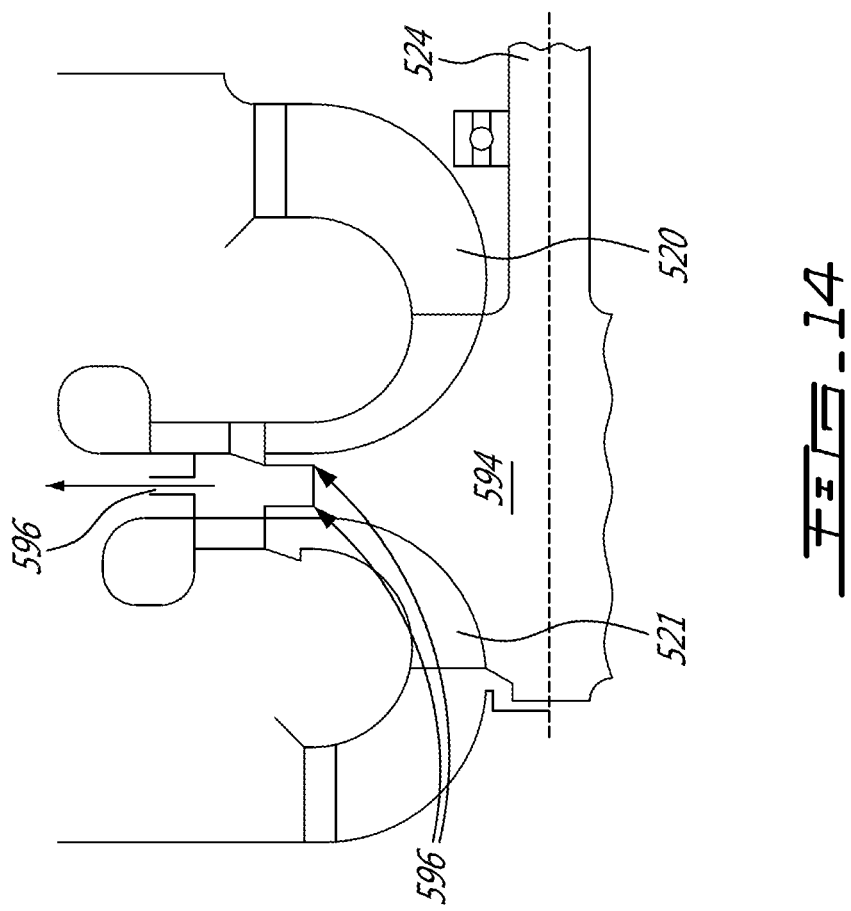

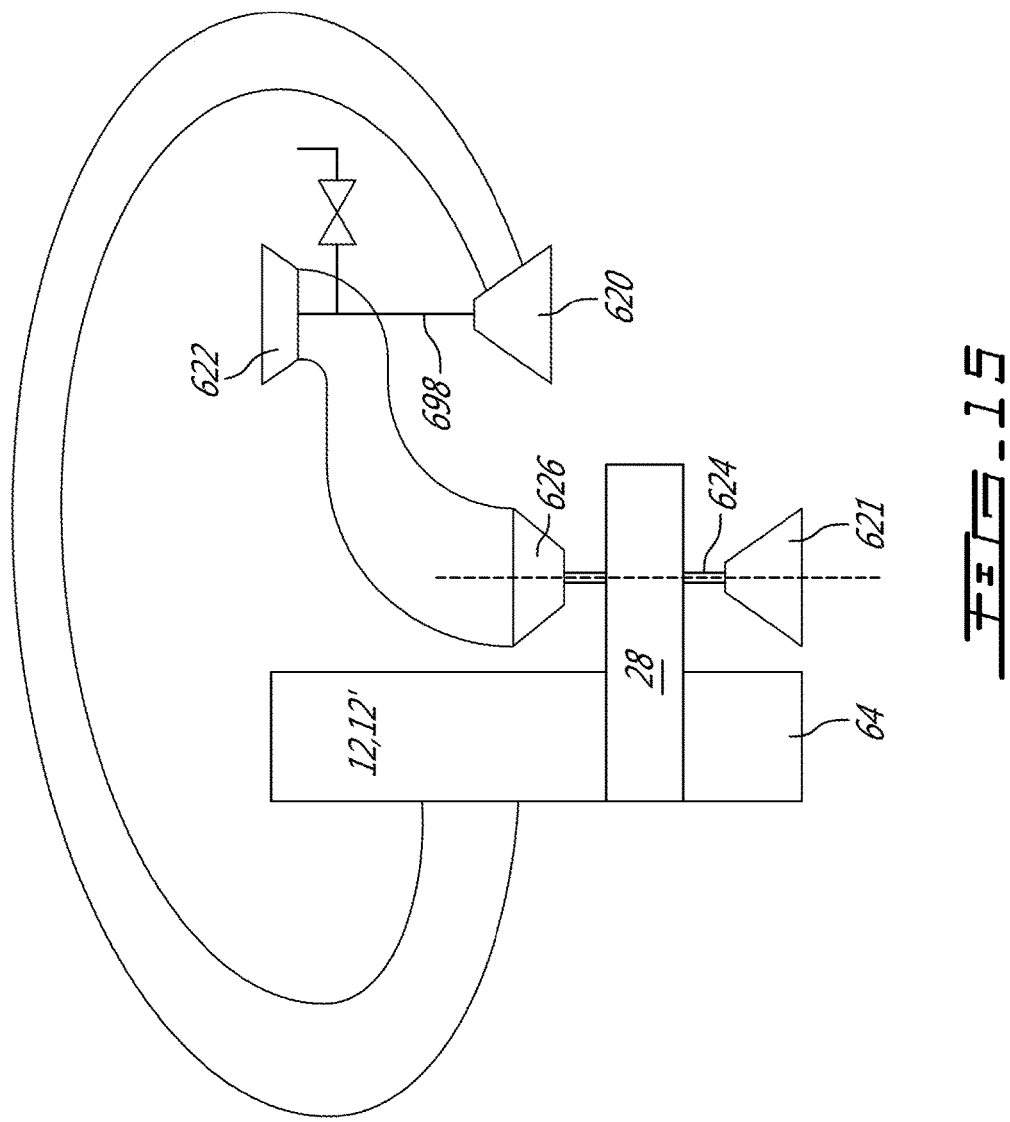

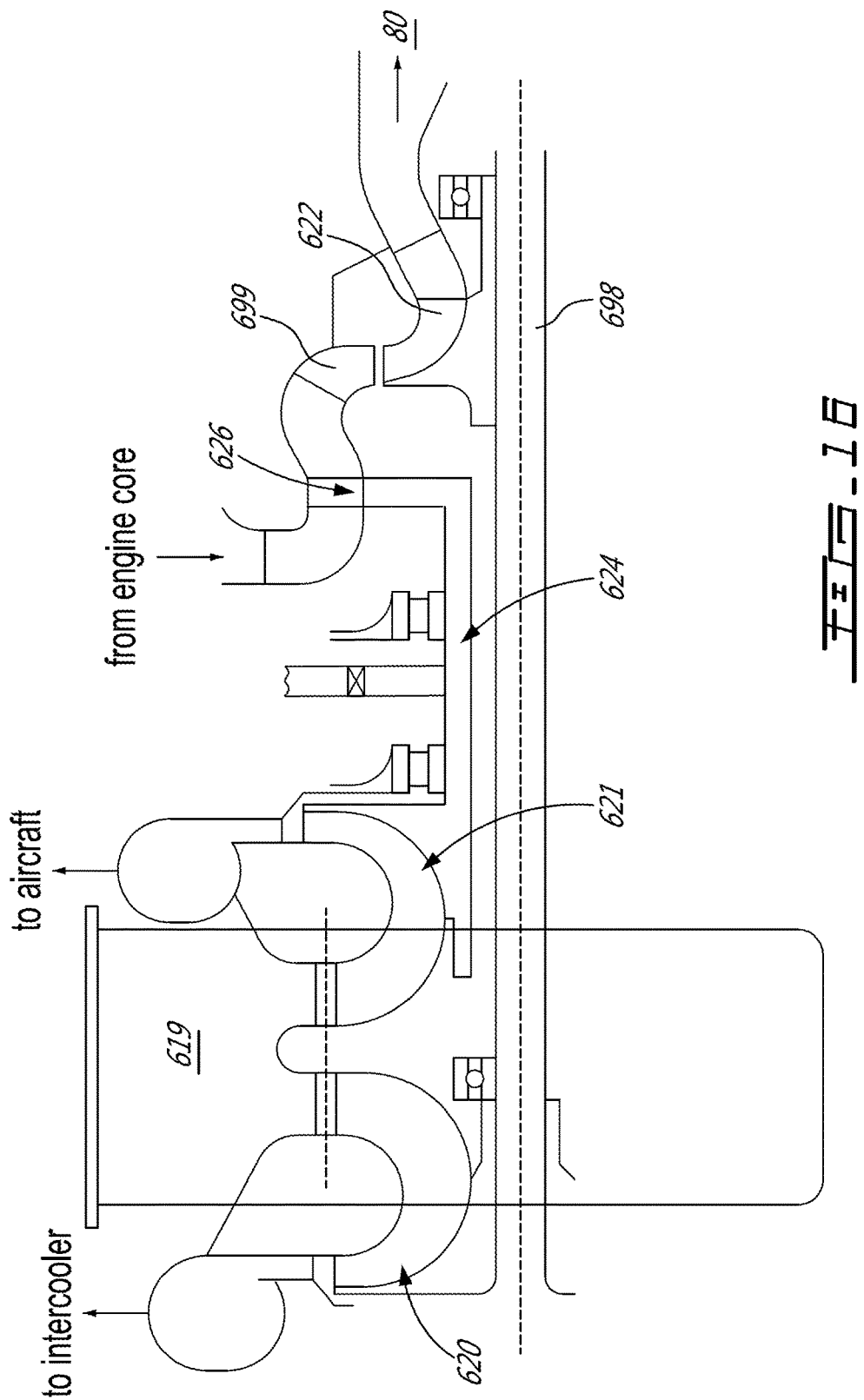

ENGINE ASSEMBLY WITH COMBINED ENGINE AND COOLING EXHAUST

CROSS-REFERENCE TO RELATED APPLICATIONS

This application claims priority from U.S. application No. 62/202,275 filed Aug. 7, 2015, the entire contents of which are incorporated by reference herein.

TECHNICAL FIELD

The application relates generally to compound engine assemblies, more particularly to such assemblies used as auxiliary power units (APU).

BACKGROUND OF THE ART

Traditional gas turbine engine auxiliary power units including an engine core with a combustor which are used to drive a generator typically require a cooling system for the generator. Such a cooling system may include fans and/or ejectors can represent significant power losses and/or create drag penalties in flight.

Moreover, such traditional gas turbine engine auxiliary power units usually have an exhaust with relatively high temperature, requiring the use of high temperature materials in the exhaust duct walls, which may represent a significant cost.

SUMMARY

In one aspect, there is provided an engine assembly for an aircraft, the engine assembly comprising: an internal combustion engine having a liquid coolant system; a heat exchanger having coolant passages in fluid communication with the liquid coolant system and air passages in heat exchange relationship with the coolant passages; an exhaust duct in fluid communication with the air passages of the heat exchanger, the exhaust duct having an outlet in fluid communication with an environment of the aircraft; a fan in fluid communication with the exhaust duct for driving a cooling air flow through the air passages of the heat exchanger and into the exhaust duct; and an intermediate duct in fluid communication with an exhaust of the internal combustion engine, the intermediate duct having an outlet positioned within the exhaust duct downstream of the fan and upstream of the outlet of the exhaust duct, the outlet of the intermediate duct spaced inwardly from a peripheral wall of the exhaust duct.

In another aspect, there is provided an engine assembly configured as an auxiliary power unit and received in a compartment of an aircraft, the engine assembly comprising: an internal combustion engine having a liquid coolant system; a turbine section having an inlet in fluid communication with an outlet of the internal combustion engine, the turbine section including at least one turbine compounded with the internal combustion engine; a heat exchanger in fluid communication with the liquid coolant system; an exhaust duct in fluid communication with the compartment through the heat exchanger, the exhaust duct having an outlet in fluid communication with an environment of the aircraft; a fan in fluid communication with the exhaust duct, the fan drivable by the internal combustion engine for driving a cooling air flow from the compartment, through the heat exchanger and into the exhaust duct; and an intermediate duct in fluid communication with an exhaust of the turbine section, the intermediate duct having an outlet positioned within the cooling air exhaust duct downstream of the fan and upstream of the outlet of the exhaust duct, the outlet of the intermediate duct spaced inwardly from a peripheral wall of the exhaust duct so that, in use, a flow of cooling air through the exhaust duct surrounds a flow of exhaust gases out of the intermediate duct, an open cross-sectional area of the outlet of the intermediate duct being smaller than an open cross-sectional area of the exhaust duct around the outlet of the intermediate duct.

In accordance with a further aspect, there is provided a method of discharging air and exhaust gases in an auxiliary power unit having an internal combustion engine, the method comprising: circulating a flow of cooling air used to cool a liquid coolant of the internal combustion engine to an exhaust duct of the auxiliary power unit and out of the auxiliary power unit; and circulating a flow of exhaust gases produced by the internal combustion engine to the exhaust duct so that the flow of cooling air surrounds the flow of exhaust gases, a mass flow the exhaust gases being smaller than a mass flow of the cooling air.

DESCRIPTION OF THE DRAWINGS

Reference is now made to the accompanying figures in which:

FIG. 13 is a schematic cross-sectional view of part of an auxiliary power unit showing a cooling inlet and heat exchanger configuration in accordance with another particular embodiment which may be alternately used in any of the above auxiliary power units;

FIG. 14 is a schematic cross-sectional view of a compressor section in accordance with another particular embodiment which may be alternately used in any of the above auxiliary power units;

FIG. 15 is a diagram of compressor and turbine configuration in accordance with another particular embodiment which may be alternately used in any of the above auxiliary power units; and FIG. 16 is a schematic cross-sectional view of the compressor and turbine configuration of FIG. 15.

DETAILED DESCRIPTION

The present description includes compound engine assembly auxiliary power units for providing supplementary ground and flight pneumatic and/or electric power for airborne auxiliary power unit applications. In a particular embodiment, the auxiliary power units are configured to directly replace a traditional gas turbine engine auxiliary power unit and perform in a more efficient manner, with power/weight and power/volume properties meeting the requirements for airborne application. Application to fixed or mobile ground power units is also possible.

Figure 1:
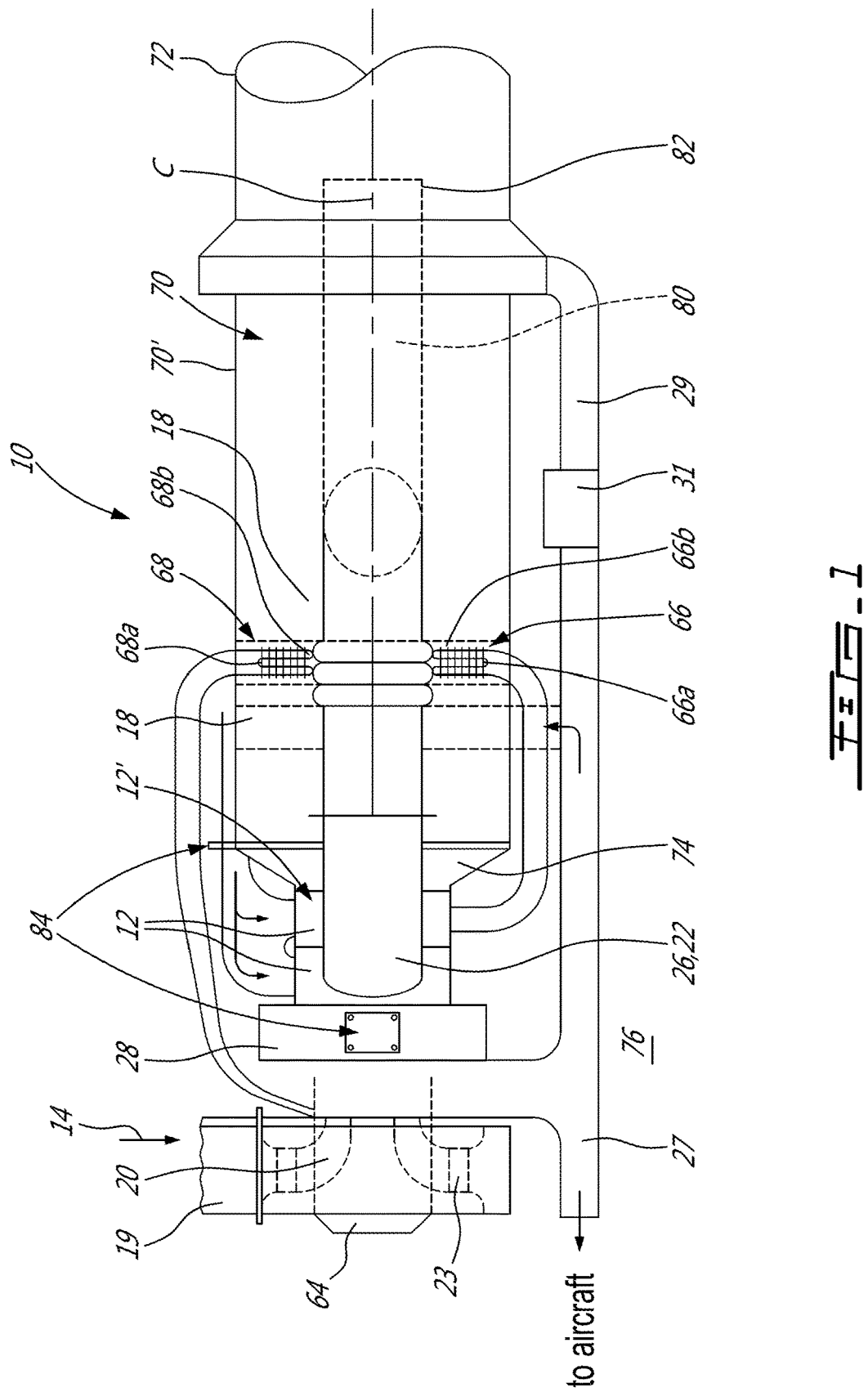
FIG. 1 is a schematic cross-sectional side view of an auxiliary power unit in accordance with a particular embodiment.
Figure 2:
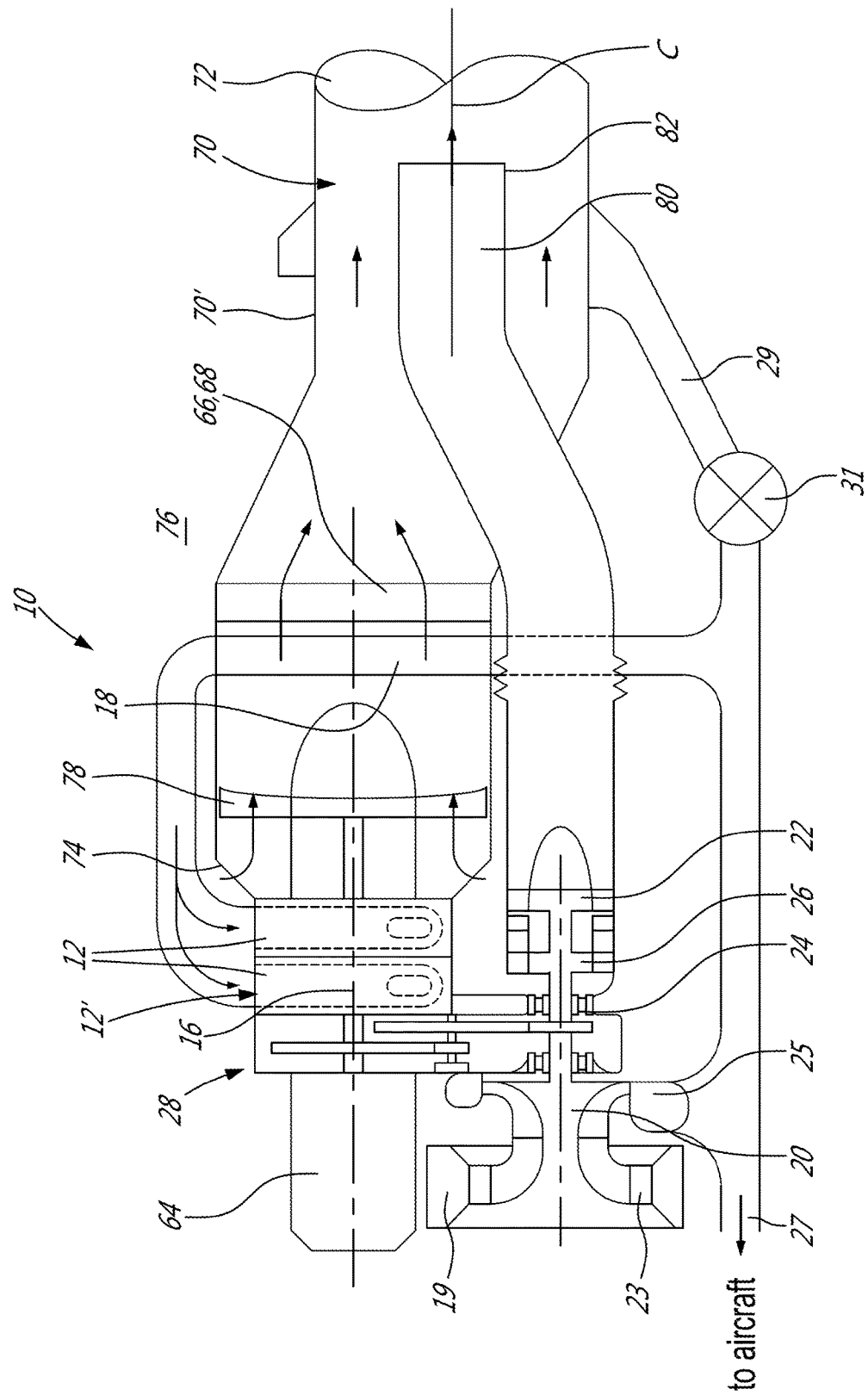
FIG. 2 is a schematic cross-sectional plan view of the auxiliary power unit of FIG. 1.
Figure 3:
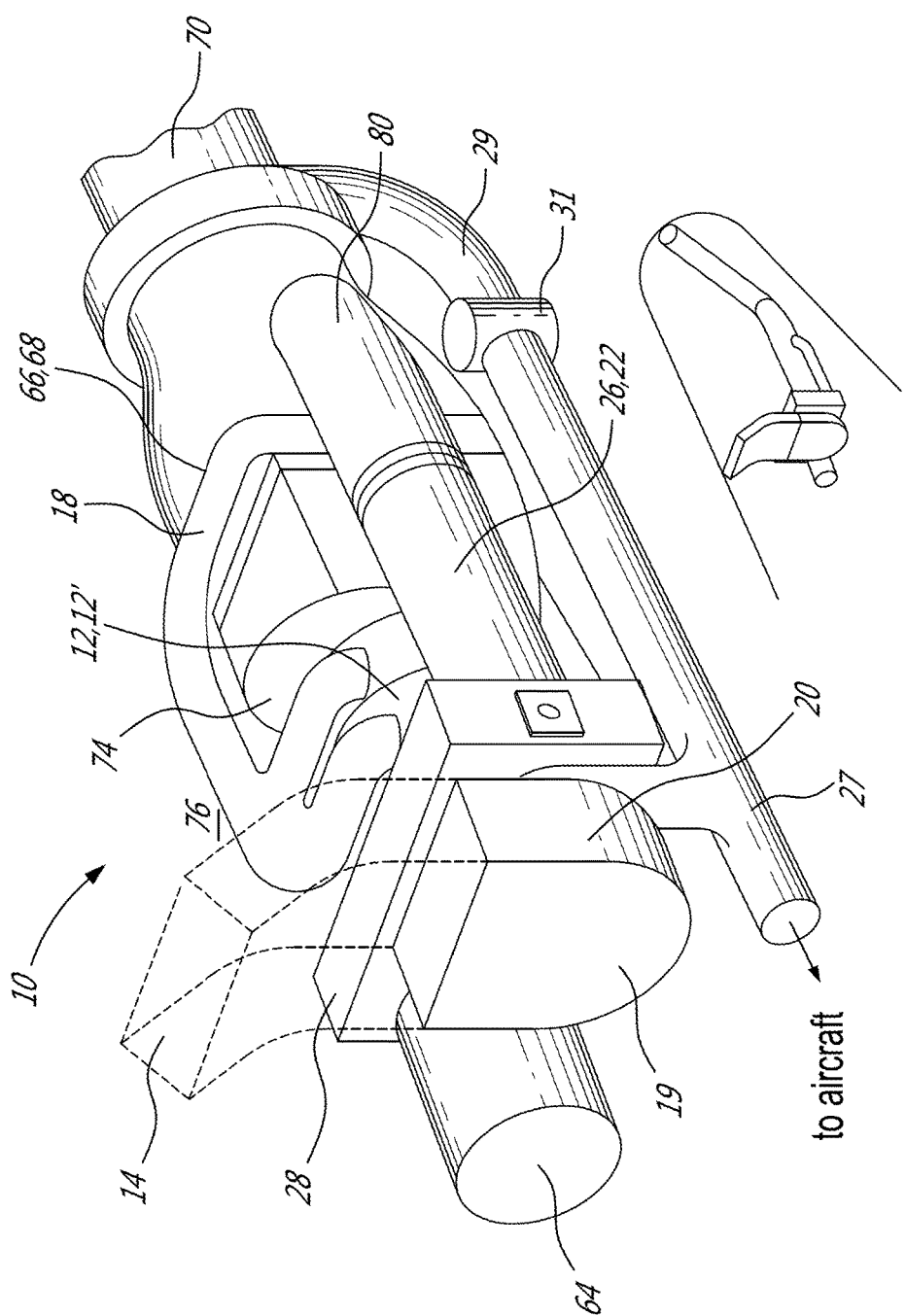
FIG. 3 is a schematic tridimensional view of the auxiliary power unit of FIG. 1.

Referring to FIGS. 1-3, an auxiliary power unit 10 in accordance with a particular embodiment is generally shown. The auxiliary power unit 10 includes an engine core 12' including one or more intermittent internal combustion engines 12 engaged to a common shaft 16 (see FIG. 2). In a particular embodiment, the intermittent internal combustion engine(s) 12 is/are rotary internal combustion engine(s), for example Wankel engine(s); it is however understood that other types of intermittent internal combustion engines may alternately be used.

Figure 4:
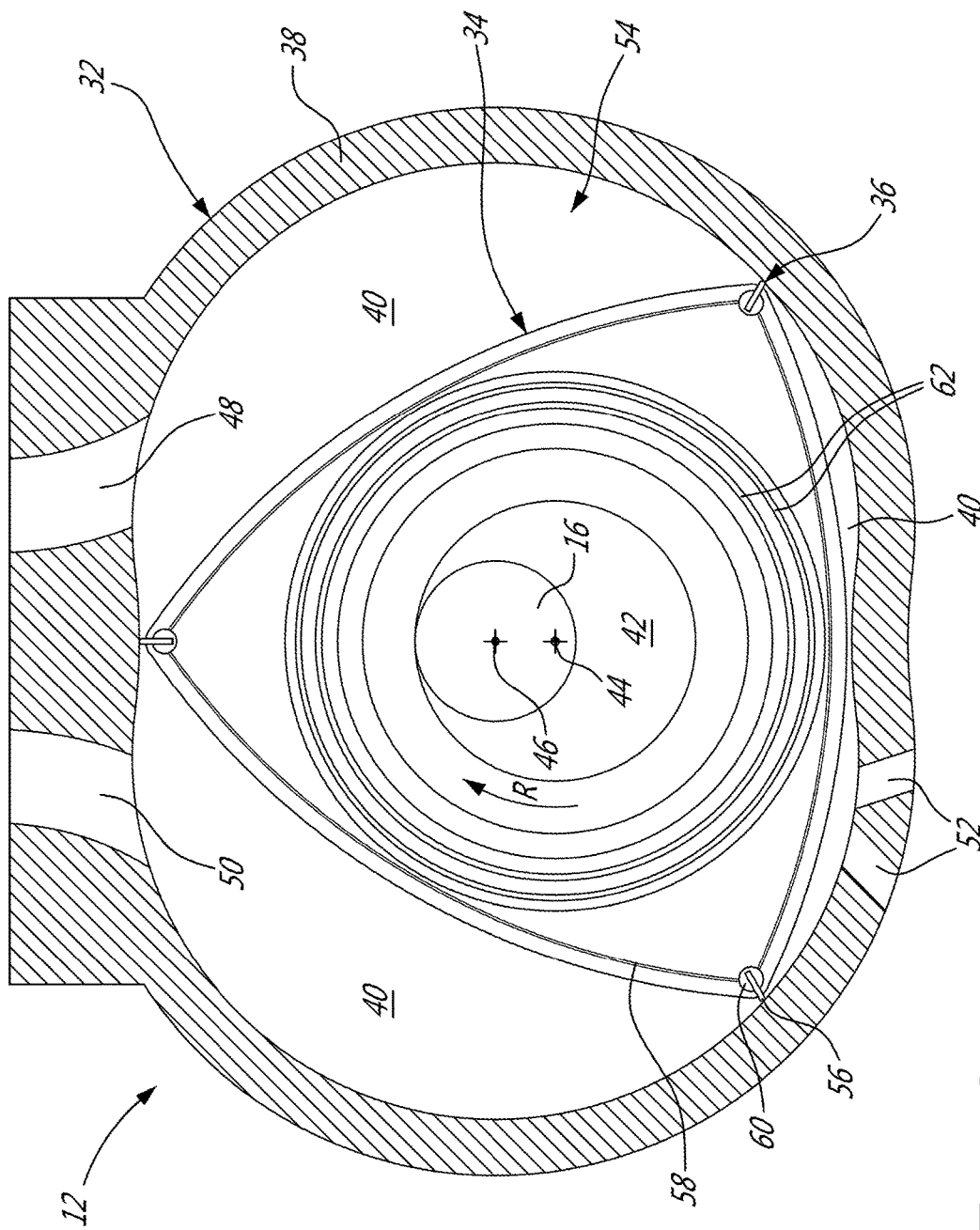
FIG. 4 is a schematic cross-sectional view of a rotary engine which may be used in the auxiliary power unit of FIGS. 1-3.

Referring to FIG. 4, an example of a Wankel engine which may be used in the engine core 12' is shown. It is understood that the configuration of the engine(s) 12, e.g. placement of ports, number and placement of seals, etc., may vary from that of the embodiment shown. The engine 12 comprises a housing 32 defining a rotor cavity having a profile defining two lobes, which is preferably an epitrochoid. A rotor 34 is received within the rotor cavity. The rotor defines three circumferentially-spaced apex portions 36, and a generally triangular profile with outwardly arched sides. The apex portions 36 are in sealing engagement with the inner surface of a peripheral wall 38 of the housing 32 to form and separate three working chambers 40 of variable volume between the rotor 34 and the housing 32. The peripheral wall 38 extends between two axially spaced apart end walls 54 to enclose the rotor cavity.

The rotor 34 is engaged to an eccentric portion 42 of an output shaft 16 to perform orbital revolutions within the rotor cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the rotor cavity to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug, glow plug or other ignition mechanism, as well as for one or more fuel injectors of a fuel injection system (not shown) are also provided through the peripheral wall 38. Alternately, the intake port 48, the exhaust port 50 and/or the passages 52 may be provided through the end or side wall 54 of the housing. A subchamber (not shown) may be provided in communication with the chambers 40, for pilot or pre injection of fuel for combustion.

For efficient operation the working chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

The fuel injector(s) of the engine 12, which in a particular embodiment are common rail fuel injectors, communicate with a source of Heavy fuel (e.g. diesel, kerosene (jet fuel), equivalent biofuel), and deliver the heavy fuel into the engine 12 such that the combustion chamber is stratified with a rich fuel-air mixture near the ignition source and a leaner mixture elsewhere.

Referring back to FIGS. 1-3, the auxiliary power unit 10 includes a supercharger compressor 20 having an outlet in fluid communication with the inlet of the engine core 12' (e.g. intake port 48 of each engine 12). Air enters an inlet plenum 19 from the aircraft inlet 14, and the air is compressed by the compressor 20 which optionally includes variable inlet guide vanes 23 and optionally includes a variable diffuser 25 (FIG. 2), which in a particular embodiment allow for management of a wide range of flow and pressure ratio conditions. The air from the compressor 20 circulates through an intercooler heat exchanger 18 to drop its temperature, for example from about 450° F. to 250° F., prior to entering the engine core. In the embodiment shown, the compressor 20 also provides bleed air for the aircraft; after leaving the compressor 20 and before reaching the intercooler 18, a portion of the compressed air is directed to a bleed duct 27 to be delivered to the aircraft.

At certain operating conditions it may be necessary to bleed excess air from the compressor 20 to avoid surge. In the embodiment shown, the conduit between the compressor 20 and the intercooler 18 is in fluid communication with an excess air duct 29 to bleed this excess air; a diverter valve 31 is incorporated in the excess air duct 29 to manage the flow of air being bled from the compressor 20. The diverter valve 31 may be scheduled to open based on sensed compressor exit conditions indicating operation close to surge.

In the engine core 12' air is mixed with fuel and combusted to provide power and a residual quantity of intermediate pressure exhaust gas. The outlet of the engine core 12' (e.g. exhaust port 50 of each engine 12) is in fluid communication with an inlet of a turbine section, so that the exhaust gases from the engine core 12' are expanded in the turbine section. The turbine section has one or more turbines 26, 22 compounded with the engine core 12'. In a particular embodiment, the turbine section includes a first stage turbine 26 having an outlet in fluid communication with an inlet of a second stage turbine 22, with the turbines 26, 22 having different reaction ratios from one another. The degree of reaction of a turbine can be determined using the temperature-based reaction ratio (equation 1) or the pressure-based reaction ratio (equation 2), which are typically close to one another in value for a same turbine, and which characterize the turbine with respect to "pure impulse" or "pure reaction" turbines:

$$\text{Reaction}(T) = \frac{(t_{S3} - t_{S5})}{(t_{S0} - t_{S5})} \quad (1)$$

$$\text{Reaction}(P) = \frac{(P_{S3} - P_{S5})}{(P_{S0} - P_{S5})} \quad (2)$$

where t is temperature and P is pressure, s refers to a static port, and the numbers refers to the location the temperature or pressure is measured: 0 for the inlet of the turbine vane (stator), 3 for the inlet of the turbine blade (rotor) and 5 for the exit of the turbine blade (rotor); and where a pure impulse turbine would have a ratio of 0 (0%) and a pure reaction turbine would have a ratio of 1 (100%).

In a particular embodiment, the first stage turbine 26 is configured to take benefit of the kinetic energy of the pulsating flow exiting the core engine(s) 12 while stabilizing the flow and the second stage turbine 22 is configured to extract energy from the remaining pressure in the flow. Accordingly, in a particular embodiment the first stage turbine 26 has a lower reaction ratio (i.e. lower value) than that of the second stage turbine 22. In a particular embodiment, the first stage turbine 26 has a reaction ratio of 0.25 or lower (temperature or pressure based) or of 0.2 or lower (temperature or pressure based), and the second stage turbine 22 a reaction ratio higher than 0.25 (temperature or pressure based) and/or is a medium reaction pressure turbine. Other values are also possible.

The compressor 20 may be driven by one or more of the turbines 26, 22 and/or the engine core 12; in the embodiment shown and as can be best seen in FIG. 2, the first and second stage turbines 26, 22 and compressor 20 are coupled to the same shaft 24. In a particular embodiment, the turbines 26, 22 and compressor 20 coupled on the same shaft 24 allow for a reasonably efficient non dimensional specific speed match between the compressor and turbine section. In a particular embodiment the turbine shaft 24 rotates at approximately 40,000 to 50,000 rpm; other values for the rotational speeds are also possible.

In the embodiment shown, the first and second stage turbines 26, 22 are both compounded with the engine core 12' by having the turbine and engine shafts 24, 16 coupled through a gearbox 28. In a particular embodiment, the transmission of the gearbox 28 includes a compound gear train such that torque and power may be communicated between the turbine and engine shafts 24, 16 in either direction.

In a particular embodiment, part of the compressor airflow which is delivered to the aircraft forms the output "load". A large part of this load is supported by the turbines 26, 22 on the same shaft 24 and therefore the load on the engine core 12' transmitted via the gearbox 28 is minimized. Thus losses and additional heat from the gearbox 28 may be minimized. Alternatively if the turbines 26, 22 provide more power than the compressor 20 requires the excess torque transmitted to the engine core 12' may be relatively small.

In a particular embodiment, the engine core 12' including rotary internal combustion engine(s) 12 runs at approximately 8000 rpm; other values are also possible. In a particular embodiment, the combined step up gear ratio defined by the gearbox 28 between the engine core shaft 16 and the turbine shaft 24 is between about 4:1 and 7:1, for example about 5:1. In a particular embodiment, a two stage compound idler system is used to provide the appropriate ratio and provide offset centres between the engine core shaft 16 and the turbine shaft 24. The offset between the engine core shaft 16 and the turbine shaft 24 may allow for the hot exhaust output from the ports 50 of the core engines 12 to be ducted directly into the turbine section while minimizing the length of the ducts.

A generator 64 is drivable by the engine core 12' to provide aircraft electrical power for accessories and/or control purposes, for example by being driven through mechanical engagement with the engine core 12' directly or through the gearbox 28, or by mechanical engagement with the turbine shaft 24. In the embodiment shown, the generator 64 is mounted directly (i.e. without intermediate gearing) to the end of the engine core shaft 16. In a particular embodiment the generator 64 is a 400 Hz, 6 pole alternator/generator with a design synchronous speed of 8000 rpm; other configurations are also possible. The alternator/generator 64 may serve as a starter. In a particular embodiment, elimination of any intermediate gearing between the engine core shaft 16 and the alternator/generator 64 eliminates heat generation and loss associated with that gearing (which may generally corresponds to approximately 2% of the rated generator load).

In a particular embodiment, the auxiliary power unit 10 includes a full authority electronic control managing all the operational requirements. The control system manages the compressor inlet guide vanes 23 and/or variable diffuser 25 (if applicable) of the shared supercharger and aircraft bleed compressor 20 to achieve the required bleed pressure and flow to the bleed duct 27 and the required fuel/air ratio in the engine core 12' to maintain the governed speed. In the event of conflict between the aircraft air requirements and the governed speed, the compressor variables are set as required to allow the system to maintain the governed speed and provide priority to the generator power. In the event this action causes excess air flow or excess pressure, these conditions may be managed by opening the diverter valve 31. A load valve (not shown) can also optionally be provided in the bleed duct 27 and managed by the control system to throttle or cut off the air supply to the aircraft.

With a constant volume combustion cycle in the engine core 12' the breakdown of waste heat of the auxiliary power unit 10 is different from a traditional gas turbine engine auxiliary power unit. Less heat is evacuated through the exhaust and more heat is given up to the engine casing. Accordingly, the engine(s) 12 of the engine core 12' have a coolant system which in a particular embodiment is distinct from any fuel and lubricating system of the auxiliary power unit 10; in other words, a dedicated coolant is circulated through the engine(s) 12 of the engine core 12', for example through multiple coolant passages defined in the walls of the housing 32, and this dedicated coolant is circulated separately and independently from the lubricant and the fuel of the auxiliary power unit 10, including the lubricant of the engine core 12'. The dedicated coolant may be a liquid coolant, for example water. A heat exchanger defining an engine core cooler 66 includes coolant passages 66a (see FIG. 1) in fluid communication with the coolant system of the engine core 12' and air passages 66b (see FIG. 1) in heat exchange relationship with the coolant passages 66a.

The generator 64 also includes a coolant system distinct from the coolant system of the engine(s) 12; the coolant system of the generator may be independent from or may be common with a lubrication system of the generator 64. The generator coolant may be a liquid coolant, for example oil. A second heat exchanger defining a generator cooler 68 includes coolant passages 68a (see FIG. 1) in fluid communication with the coolant system of the generator 64 and air passages 68b (see FIG. 1) in heat exchange relationship with the coolant passages 68a. In the embodiment shown, both coolers 66, 68 are provided in a common package, with the coolant passages 66a, 68a of the two coolers 66, 68 being distinct from one another. In a particular embodiment where the generator coolant is oil or another suitable lubricant, the generator coolant system is common with (in fluid communication with) the lubrication system of the auxiliary power unit 10, which distributes lubricant to various components of the auxiliary power unit 10 (e.g. bearings, gears, etc., of the engine core 12', the compressor 20, the turbines 22, 26, the gearbox 28), so the second heat exchanger 68 is also an engine lubricant cooler. Alternately, a separate heat exchanger (not shown) may be provided for the lubrication system of the auxiliary power unit 10, and the cooler 68 may be configured to cool only the generator lubricant/coolant.

The air passages 66b, 68b of the coolers 66, 68 are in fluid communication with an exhaust duct 70 of the auxiliary power unit 10; the exhaust duct 70 has an outlet 72 in fluid communication with the environment of the aircraft, so that the cooling air flow can be discharged to atmosphere. The exhaust duct 70 defines a cooling inlet 74 in fluid communication with an aircraft compartment 76 containing the auxiliary power unit 10. In the embodiment shown, the coolers 66, 68 are received in the exhaust duct 70. The intercooler 18 is also received in the exhaust duct 70, upstream of the coolers 66, 68.

A fan 78 (FIG. 2) is rotatable by the engine core 12' and in fluid communication with the exhaust duct 70 for driving the cooling air flow from the compartment 76, through the heat exchangers (coolers 66, 68 and intercooler 18) and out of the exhaust duct 70 to atmosphere. In the embodiment shown, the fan 78 is received in the exhaust duct 70 upstream of the heat exchangers 18, 66, 68 and is directly driven by the engine core 12', by being mounted on the end of the engine core shaft 16 opposite from the generator 64. In a particular embodiment, direct drive of the fan 78 by the engine core shaft 16 allows to avoid additional gear loss and heat which would be produced by a gear drive. Alternately, the fan 78 may be driven through a transmission (whether in gearbox 28 or another transmission specific to the fan 78), or be electrically or hydraulically driven by a motor obtaining power directly or indirectly from the engine core 12'.

In a particular embodiment, the blade speed of the fan 78 is sufficiently low such that the fan 78 can be made of a common Al alloy, organic composite or thermoplastic material. In a particular embodiment, the fan 78 rotates at about 8000 rpm; other values are also possible.

Rotation of the fan 78 induces flow from the compartment 76, which also provides a compartment ventilation function. In a particular embodiment, side openings from the main aircraft inlet 14 allow cooling air to flow into the compartment 76 under the driving action of the fan 78 to cool the surfaces of the auxiliary power unit 10 exposed within the compartment 76. In a particular embodiment, the fan inlet is protected by a screen to prevent larger objects from damaging the fan 78.

Although multiple distinct coolers are shown in series on FIGS. 1-3, alternately only one integrated cooler unit may be used with areas sub divided dedicated to the engine lubricant/generator coolant, engine core liquid coolant, and intercooling functions. The heat exchangers 18, 66, 68 may also be angled at an angle more than 90° to the flow direction, for example to optimize the area presented to the airflow. Although not shown, the coolers 66, 68 may include a thermal bypass system to prevent over-cooling at lower ambient temperatures, for example managed by the electronic control system based on sensed coolant temperatures, or by any other suitable thermostat concept.

The cooling system of the engine core 12' is thus integrated with that of the generator 64 and with the cooling system for the lubricant of the auxiliary power unit 10. In a particular embodiment, this integration allows for a reduction or minimization of the power loss from fans and ejectors traditionally used, and/or to avoid cooling drag penalties in flight. In a particular embodiment, the auxiliary power unit 10 is configured to reduce or avoid the generation of additional heat, for example from gear train losses.

Through the integrated cooling system, the same fan 78 drives the cooling air flow through the compartment 76, engine core cooler 66, intercooler 18, and generator/engine lubricant cooler 68, and then discharges the cooling air out to atmosphere through the exhaust duct 70; in a particular embodiment, the entire auxiliary power unit 10 and its cooling system can be installed and removed as a single assembly with interconnects and aircraft inlet and exhaust similar to that of a traditional gas turbine engine auxiliary power unit. In use and in a particular embodiment, the generator 64 and the engine core 12' are thus cooled by circulating a first coolant (e.g. water) through the engine(s) 12 of the engine core 12', circulating a second coolant (e.g. oil) through the generator 64, and driving the cooling air flow in heat exchange relationship with the first and second coolants using the fan 78 driven by the auxiliary power unit 10.

If applicable any diverted air from the compressor 20 can also be introduced in the exhaust duct 70. Accordingly, in the embodiment shown, the excess air duct 29 provides a direct fluid communication between the compressor 20 and a portion of the exhaust duct 70 located downstream of the fan 78 and heat exchangers 18, 66, 68.

In a particular embodiment, the exhaust duct 70 is located in a tail cone of the aircraft. As can be best seen in FIGS. 1-2, an intermediate duct 80 extends in fluid communication with the exhaust of the engine core 12', by being connected to an exhaust of the second stage turbine 22. The intermediate duct 80 has an outlet 82 positioned in the exhaust duct 70, downstream of the fan 78 and upstream of the outlet 72 of the exhaust duct 70. The outlet 82 of the intermediate duct 80 is spaced radially inwardly from a peripheral wall 70' of the exhaust duct 70. The air and exhaust gases are thus discharged in the exhaust duct 70 so that the flow of cooling air surrounds the flow of exhaust gases. The mass flow and/or volume of flow of exhaust gases is/are smaller than the flow of cooling air. In a particular embodiment, the mass flow of exhaust gases is 20% or less of the mass flow of cooling air. An open cross-sectional area of the outlet 82 of the intermediate duct 80 is smaller than an open cross-sectional area of the exhaust duct 70 around the outlet 82 of the intermediate duct 80 (where "open cross-sectional area of the exhaust duct 70" refers to the cross-sectional area of the exhaust duct 70 not occupied by the intermediate duct 80). In a particular embodiment, the ratio of the diameter of the intermediate duct 80 on the diameter of the exhaust duct 70 is from 0.2 to 0.4, for example around ⅓. Other values are also possible, depending for example on the optimisation of the weight and cost of the auxiliary power unit 10 as a whole.

In the embodiment shown, the intermediate duct 80 is concentric with the peripheral wall 70' of the exhaust duct 70; the flow of exhaust gases is thus discharged along a central axis C of the exhaust duct 70.

In a particular embodiment, the larger and cooler cooling air flow surrounding the exhaust gas flow allows for the peripheral wall 70' of the exhaust duct 70 to be made of materials requiring a lower resistance to high temperature than materials which would be in direct contact with the exhaust gas flow, where "resistance to high temperature" refers to the ability of a material to keep their strength, rigidity and durability when submitted to high temperatures. This may allow for the use of less expensive materials for the peripheral wall 70' of the exhaust duct 70. In a particular embodiment, the temperature of the flow against the peripheral wall 70' of the exhaust duct 70 is lower than that against the exhaust duct of a traditional gas turbine engine auxiliary power unit, so that the use of high temperature materials (e.g. nickel or titanium alloy) is not required for the peripheral wall 70'. For example, the temperature of the exhaust gases may be 800° F. or more, potentially up to 1200° F.–1400° F., while the cooling air flow temperature may be 250° F. or less; surrounding the exhaust gas flow with the cooling air flow thus significantly reduces the temperature of the flow in contact with the peripheral wall 70'. In a particular embodiment, the peripheral wall 70' of the exhaust duct 70 is made of any suitable aluminum alloy, any suitable light metal alloy, any suitable composite material including, but not limited to, carbon fiber composite materials, or any suitable type of polymer.

In a particular embodiment, the fan 78 can be designed to deliver enough kinetic energy to act as an ejector pump for the exhaust from the turbines 26, 22 and increase the energy delivered by the turbines 26, 22.

In particular embodiment, the exhaust of the turbine section is configured so that the flow of exhaust gases expelled from the intermediate duct 80 has a higher velocity than the surrounding cooling air flow circulating in the exhaust duct 70. In a particular embodiment, the difference in velocity is selected to create an entrainment effect in the cooling air flow, so as to help circulation of the cooling air flow through the heat exchangers 18, 66, 68 driven by the fan 78. This may allow for the size of the fan 78 to be reduced, as compared to a configuration without such an entrainment effect.

In a particular embodiment, the inlet and exhaust of the auxiliary power unit 10 are located on the aircraft skin such that the inlet ram pressure significantly exceeds the static pressure at the exhaust plane; this pressure may be used with a venturi effect to depress the static pressure at the exhaust plane of the turbines 26, 22 in flight, and/or the fan 78 may be reversible such that it can act as a turbine and recover energy in high ram conditions where it is not needed to boost cooling flow.

In a particular embodiment, the auxiliary power unit inlet 14 at the aircraft fuselage is provided with a door to prevent unintended wind-milling and drag when the auxiliary power unit is not operating. Where high speed performance is required in flight this door can be shaped to act as a ram air scoop.

In a particular embodiment, additional aircraft thrust is gained or the drag penalty is reduced by taking credit for the waste thermal energy transferred to the cooling. In order to maximise this effect (comparable to the Meredith effect in liquid cooled propulsion engines) the sizing of the outlet 82 of the intermediate duct 80 is optimized and the exhaust vector set to provide the maximum propulsive benefit to the aircraft.

Referring to FIG. 1, in a particular embodiment the auxiliary power unit 10 includes mounts 84 on the gearbox 28 and near the inlet 74 of the exhaust duct 70; a single inlet flange and a single exhaust flange are provided for ease of mounting. The integrated cooling system also facilitates installation of the auxiliary power unit 10 in the compartment 76.

FIGS. 5-8 and 11 show an auxiliary power unit 110 in accordance with another embodiment, where elements similar to that of the embodiment of FIGS. 1-3 are identified with the same reference numerals and will not be further described herein.

In this embodiment, the engine core cooler 166 and the generator/engine lubricant cooler 168 are disposed in parallel with respect to one another. As can be best seen in FIG. 7, a cooling air duct 186 extends radially outwardly around a circumference of the exhaust duct 70. The cooling air duct 186 has an outlet in fluid communication with the exhaust duct 70 and an inlet disposed radially outwardly of the outlet and in fluid communication with the compartment 76 through the coolers 166, 168. The engine core cooler 166 and the generator/engine lubricant cooler 168 each extend around a respective portion of a circumference of the cooling air duct 186. The fan 78 is located in the exhaust duct 70, thus downstream of the coolers 166, 168. As can be seen from FIG. 6, the two coolers 166, 168 together extend around only part of the circumference of the exhaust duct 70, with the intermediate duct 80 and excess air duct 29 extending adjacent the exhaust duct 70 in the circumferential portion free of the coolers 166, 168. The coolers 166, 168 can be mounted directly to the auxiliary power unit 110 as shown, or could alternately be installed on the aircraft and linked to the auxiliary power unit 110 with tubing (e.g. flexible tubing).

Referring back to FIG. 7, it can be seen that the air passages 166b, 168b of the coolers 166, 168 extend along a radial direction R of the auxiliary power unit 110. Alternately, other orientations for the coolers 166, 168 are possible.

Figure 7:
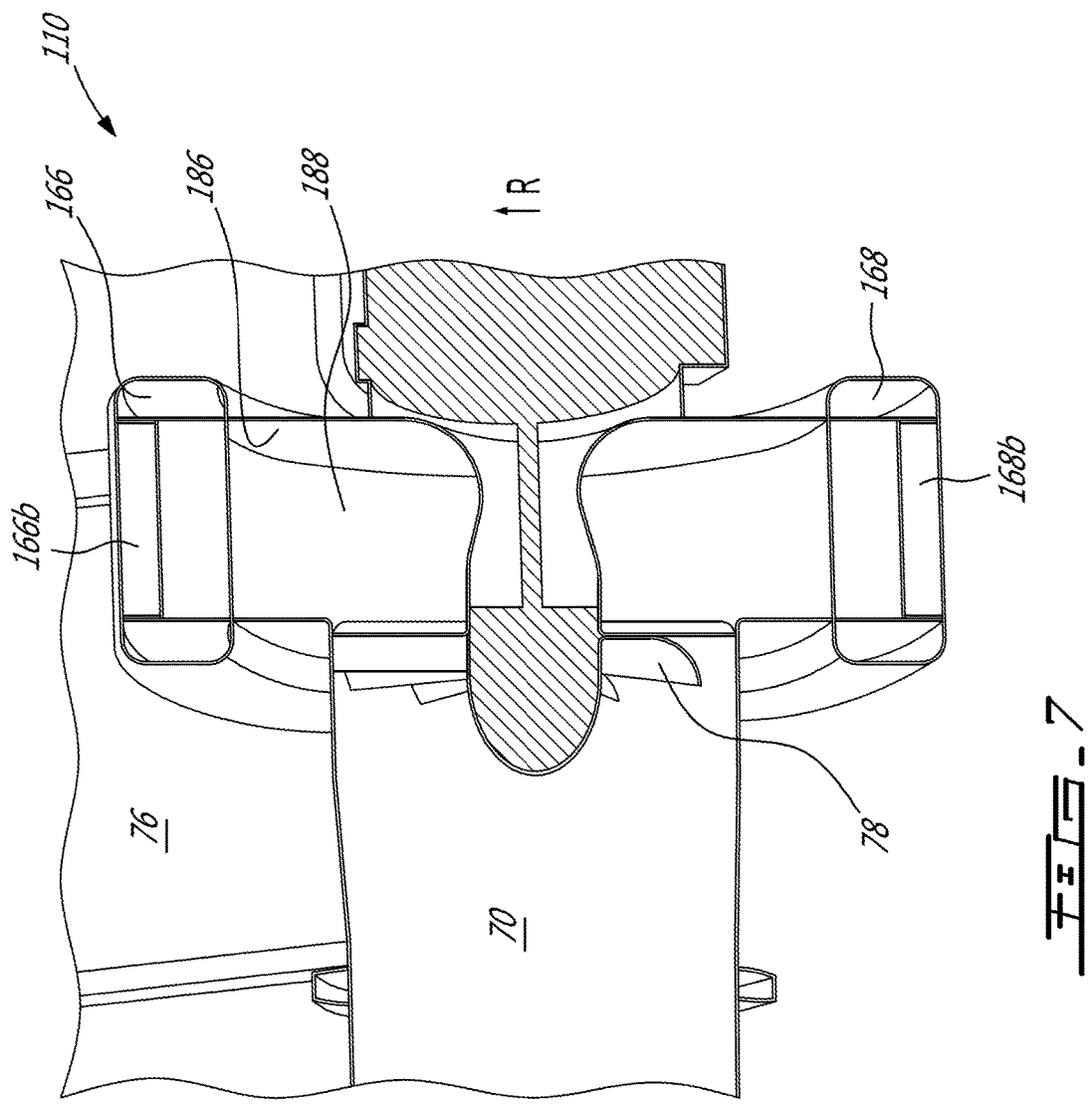
FIG. 7 is a schematic cross-sectional view of part of the auxiliary power unit of FIG. 5.
Figure 8:
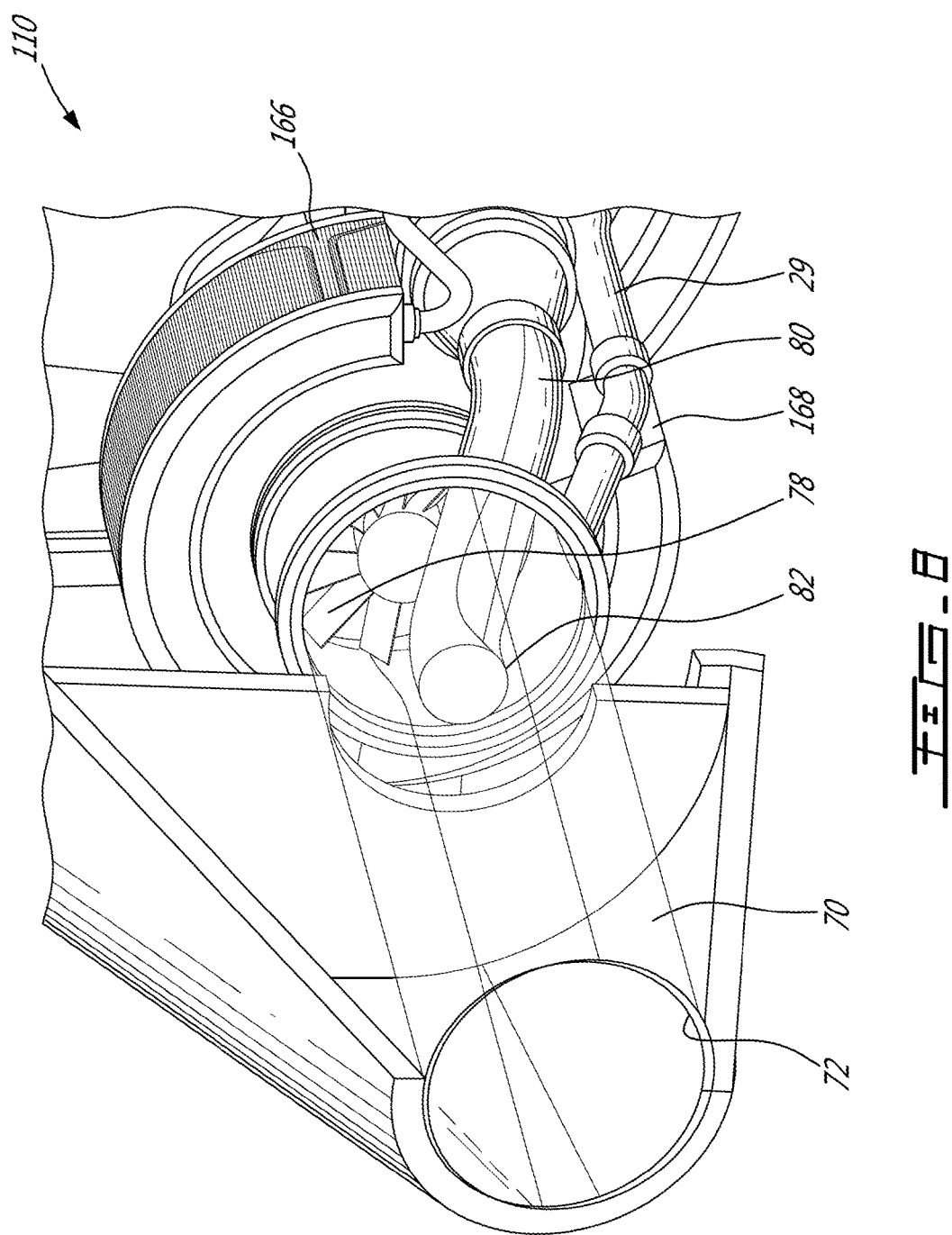
FIG. 8 is a schematic tridimensional view, partly in transparency, of an end of the auxiliary power unit of FIG. 5 received in a tail cone of an aircraft.

Still referring to FIG. 7, variable pitch blades or variable inlet guide vanes 188 can be provided in the cooling air duct 186 and its junction with the exhaust duct 70, immediately upstream of the fan 78, so as to be able to modulate the airflow through the coolers 166, 168 and/or control fan power absorption at lower heat load conditions.

Figure 5:
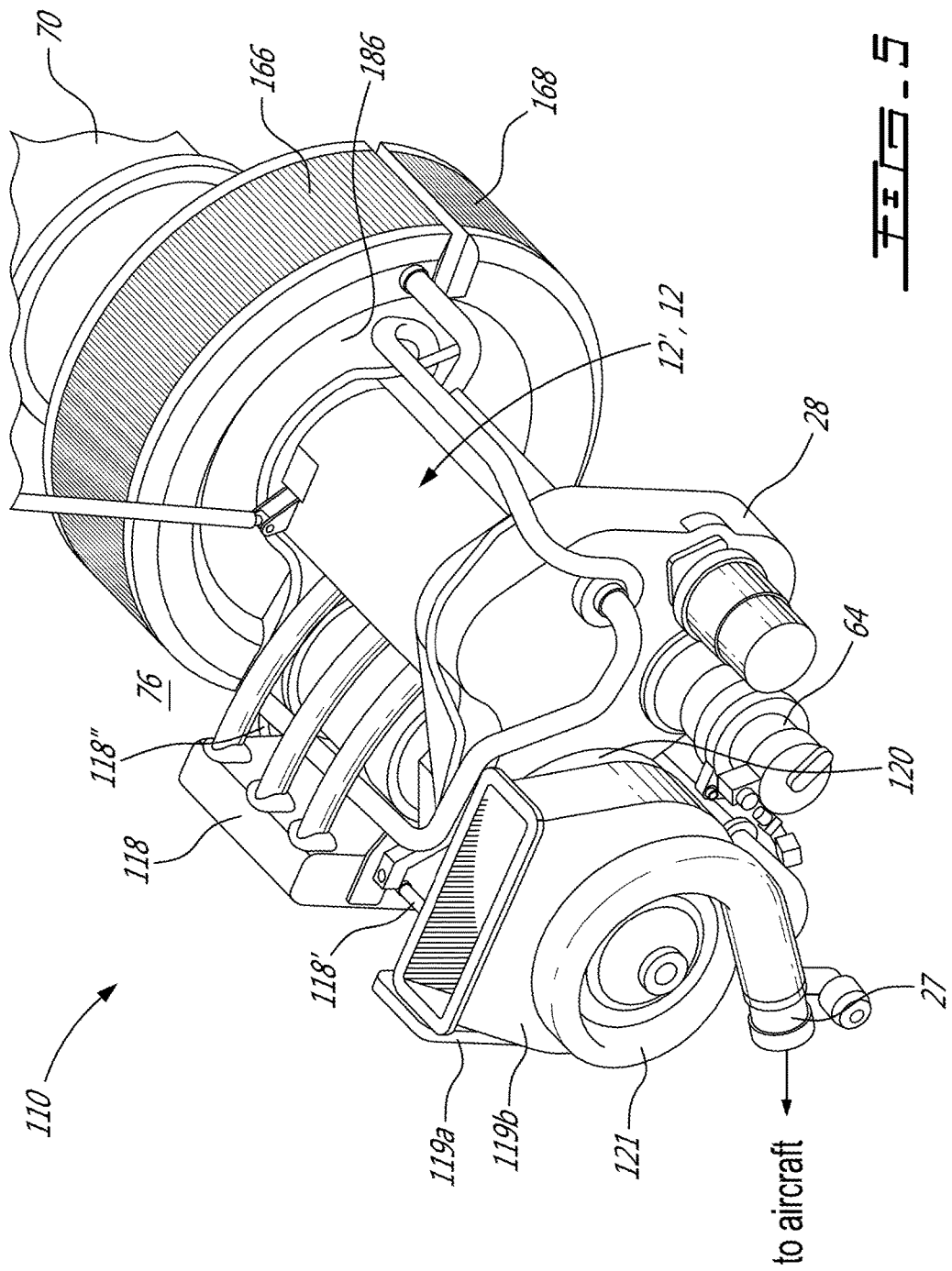
FIG. 5 is a schematic tridimensional view of an auxiliary power unit in accordance with another particular embodiment.
Figure 6:
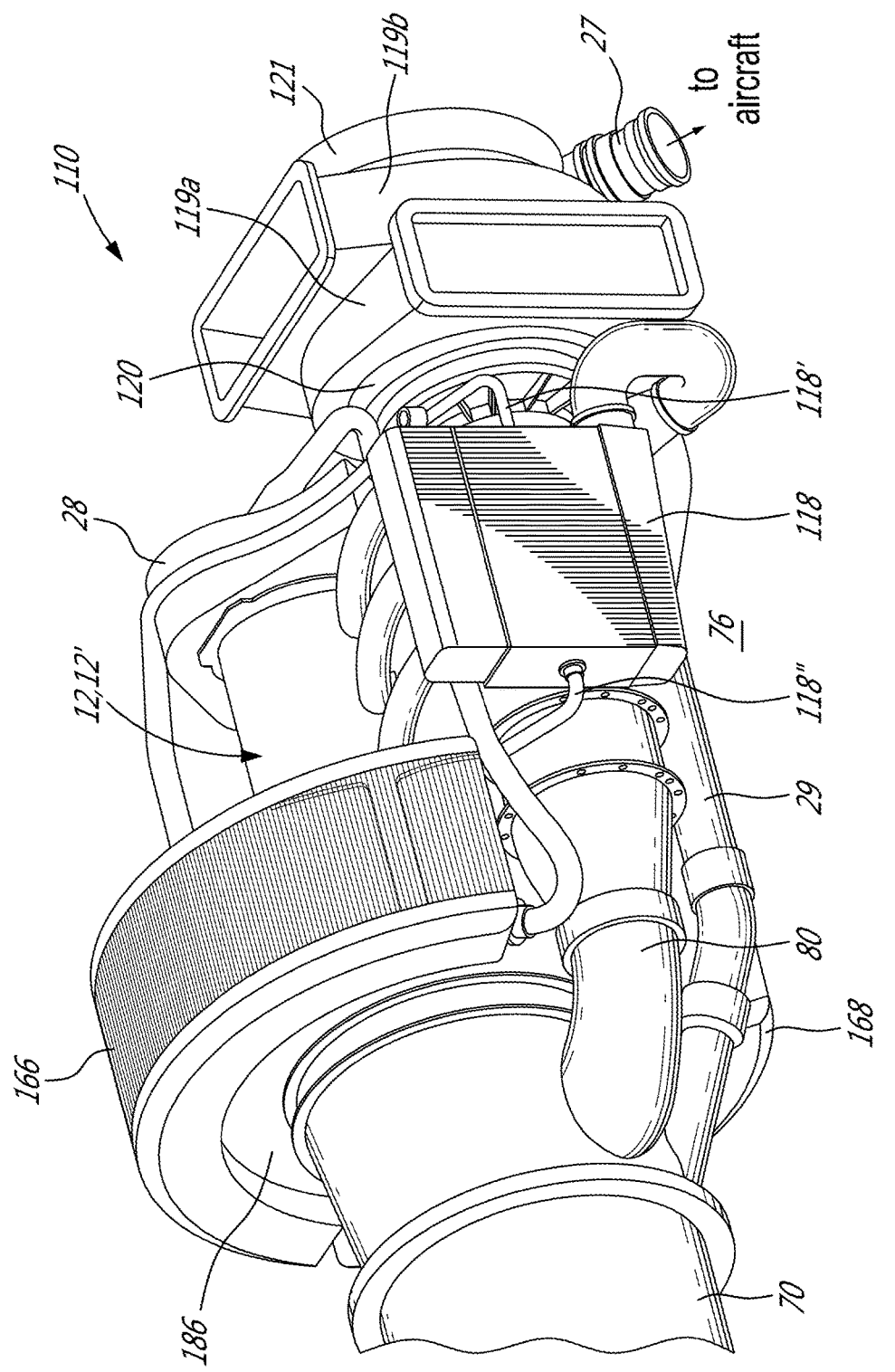
FIG. 6 is another schematic tridimensional view of the auxiliary power unit of FIG. 5, taken from an opposite side.

As can be best seen in FIGS. 5-6, the intercooler 118 is not in fluid communication with the exhaust duct 70, and is instead configured as an air to liquid cooler; the intercooler 118 includes fluid passages receiving the coolant from the engine core 12' through one or more conduits 118' (for example at about 200° F.) and circulating the coolant in heat exchange relationship with the compressed air from the compressor 120 (for example at 450° F.) before the coolant is circulated to the engine core cooler 166 through one or more conduits 118". The intercooler 118 is thus located upstream of the engine core cooler 166 and downstream of the engine core 12' in the coolant circulation path.

Figure 11:
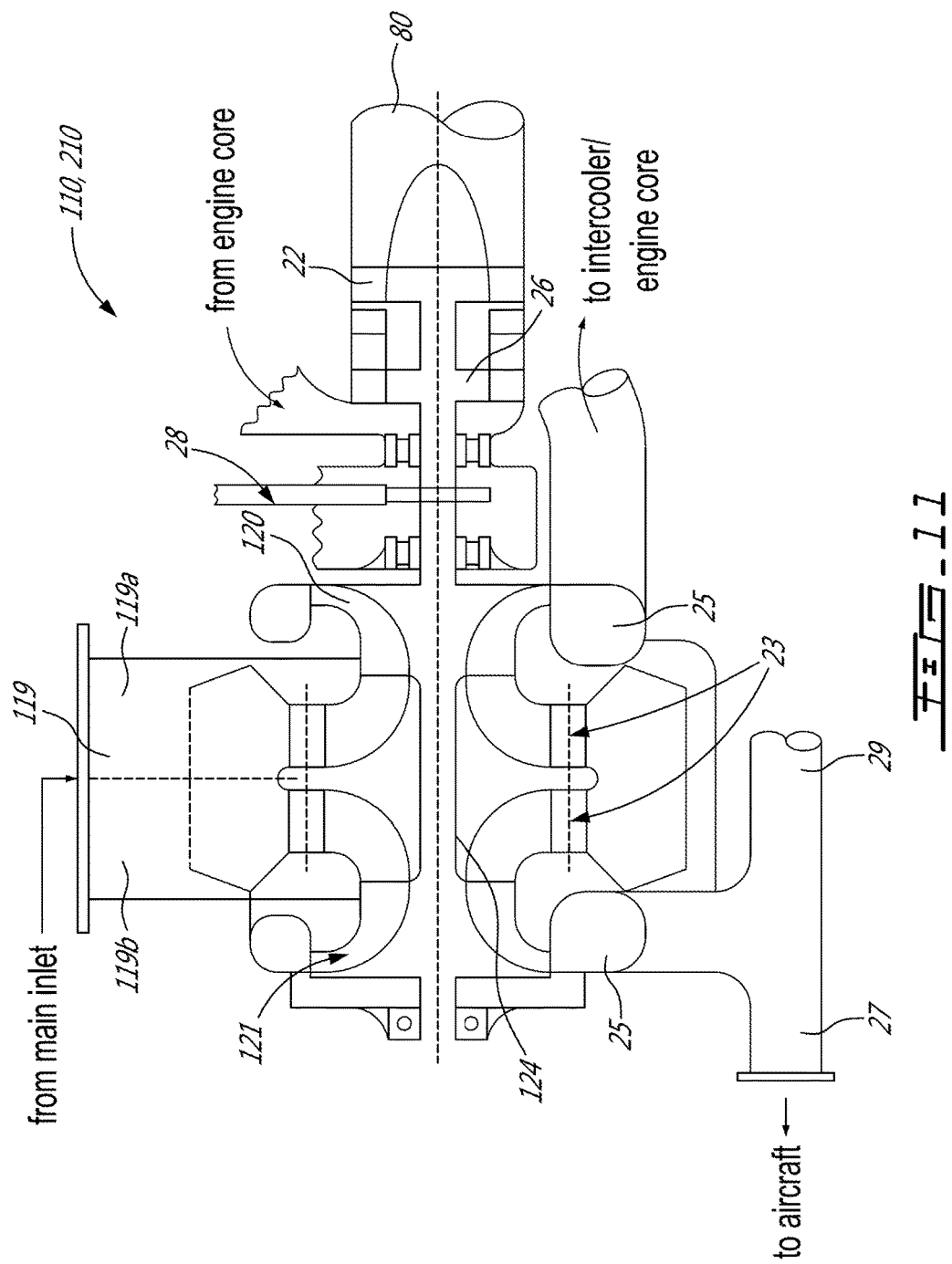
FIG. 11 is a schematic cross-sectional view of compressor and turbine sections of the auxiliary power units of FIG. 5 and of FIG. 9.

As can be best seen in FIGS. 6 and 11, in this embodiment two compressors are provided: a supercharger compressor 120 to provide compressed air to the engine core 12', and a bleed compressor 121 to provide bleed air for the aircraft. The two compressors 120, 121 are connected to the same shaft 124, which also receives the turbines 26, 22 of the turbine section. The compressor inlets can be connected to a common plenum 119 (FIG. 11) or to a respective plenum 119a, 119b (FIGS. 5-6, dotted lines in FIG. 11), with the plenum(s) 119, 119a, 119b being connected to the main inlet 14. In a particular embodiment, such a configuration allows for accommodating different functional requirements for the supercharging flow (to the engine core 12') and the aircraft flow (to the bleed duct 27).

Figure 9:
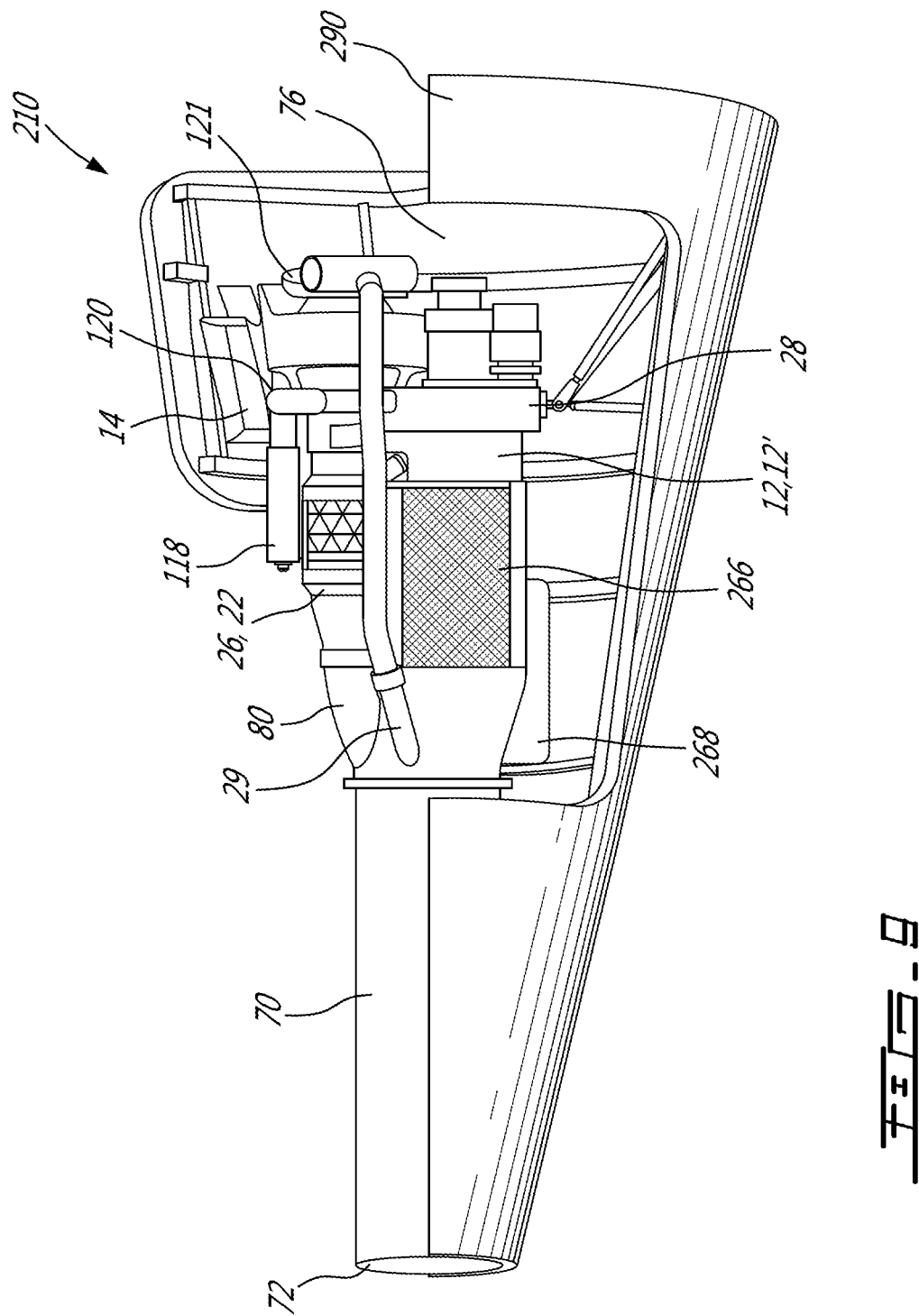
FIG. 9 is a schematic bottom view of an auxiliary power unit and tail cone in accordance with a particular embodiment, with part of the tail cone removed for clarity.
Figure 10:
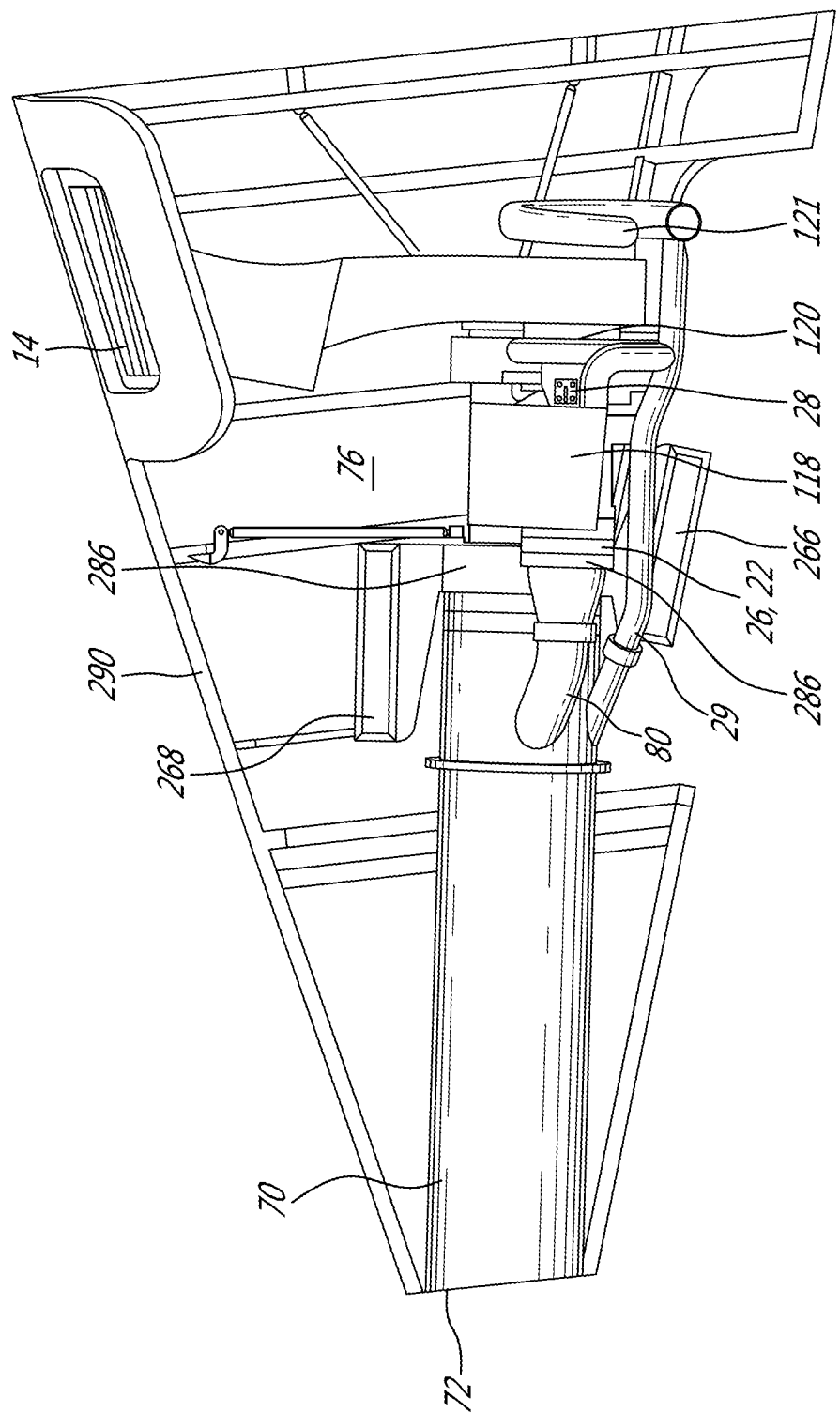
FIG. 10 is a schematic side view of the auxiliary power unit and tail cone of FIG. 9, with part of the tail cone removed for clarity.

FIGS. 9-10 show an auxiliary power unit 210 similar to that of FIGS. 5-8, where elements similar to that of the embodiment of FIGS. 1-3 and/or to that of the embodiment of FIGS. 5-8 are identified with the same reference numerals and will not be further described herein. The compartment 76 is shown as defined by the tail cone 290 of the aircraft, with the exhaust duct outlet 72 located at the tip of the tail cone 290. The tail cone 290 defines the main inlet 14 to the compartment 76, to which the compressor inlets are connected. The auxiliary power unit of FIGS. 1-3 and/or of FIGS. 5-8 may be similarly installed.

The engine core cooler 266 and the generator/engine lubricant cooler 268 have a rectangular configuration and are circumferentially and axially offset from one another about the exhaust duct 70; each is connected to the exhaust duct 70 through a respective cooling air duct 286 (FIG. 10) extending radially outwardly from the exhaust duct 70. One or both of the coolers 266, 268 can have air conduits angled with respect to the radial direction of the auxiliary power unit 210.

Figure 12:
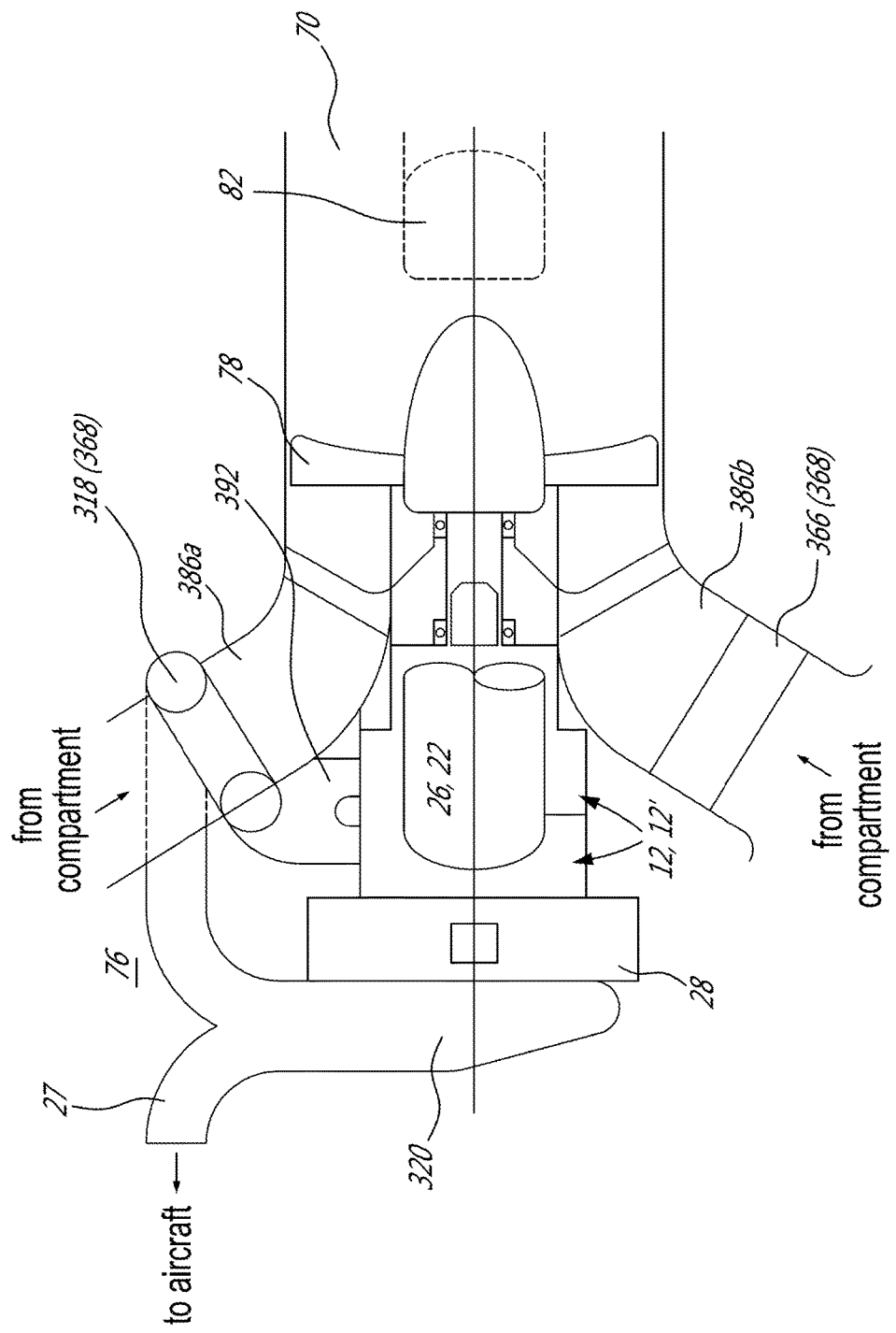
FIG. 12 is a schematic cross-sectional view of part of an auxiliary power unit showing a cooling inlet and heat exchanger configuration in accordance with another particular embodiment which may be alternately used in any of the above auxiliary power units.

FIG. 12 shows an alternate configuration for the cooling inlet and heat exchangers 318, 366, 368, which may be used in any of the auxiliary power units 10, 110, 210 described above. A bifurcated inlet system includes two separate cooling air ducts 386a, 386b, which in a particular embodiment may allow minimizing the length of the cooling air ducts 386a, 386b and/or of the coolant/lubricant conduits connected to the coolers 366, 368 and/or of the compressed air conduits connecting the intercooler 318 to the compressor 320 and to the engine core 12'. The cooling air duct 386a closest to the engine core inlet manifold 392 is dedicated to the intercooling function and accordingly receives the intercooler 318, which is this embodiment is air cooled. The other cooling air duct 386b receives one or both of the engine core cooler 366 and the generator/engine lubricant cooler 368. The position of the heat exchangers within the cooling air ducts 386a, 386b (e.g. how the heat exchangers are grouped in each cooling air duct) may vary, for example depending on the relative demand for cooling air. The pressure losses in each cooling air duct 386a, 386b of the bifurcated system are balanced to avoid distorting the inlet flow of the fan 78, which is located in the exhaust conduit 70 downstream of the heat exchangers 318, 366, 368. In a particular embodiment, the generator/engine lubricant cooler 368 is positioned in the same cooling air duct 386a as the intercooler 318, with the engine core cooler 366 located in the second cooling air duct 386b. In another particular embodiment, a whole or a part of the engine core cooler 366 is positioned in the same cooling air duct 386a as the intercooler 318, with the generator/engine lubricant cooler 368 located in the second cooling air duct 386b.

FIG. 13 shows another alternate configuration for the cooling inlet and heat exchangers 418, 466, 468, which may be used in any of the auxiliary power units 10, 110, 210 described above. A bifurcated cooling air duct 486 extends non-perpendicularly and at a non-zero angle with respect to the exhaust conduit 70, with an outlet of the cooling air duct 486 being in fluid communication with the exhaust conduit 70 upstream of the fan 78. The heat exchangers are received in the cooling air duct, with the engine core cooler 466 and generator/engine lubricant cooler 468 being located upstream of the intercooler 418. In a particular embodiment, the heat exchangers 418, 466, 468 are placed as close to the engine core 12' as possible, and weight, volume and losses associated with piping the cycle air as well as the lubricant and liquid coolant is minimized.

In a particular embodiment, having the heat exchangers 166, 168, 266, 268, 318, 366, 368, 418, 466, 468 located upstream of the fan 78 allows for the heat exchangers to be smaller, since the air circulated therethrough is cooler. However, the fan 78 downstream of the heat exchangers is exposed to warmer air than a fan upstream of the heat exchangers, and accordingly the power requirement for the fan 78 downstream of the heat exchangers may be greater.

FIG. 14 shows an alternate configuration for the two compressors, which may be used in replacement of the compressor(s) of any of the auxiliary power units 10, 110, 210 described above. The supercharger compressor 520 providing the compressed air to the engine core 12' and the bleed compressor 521 providing the compressed air to the aircraft are arranged on both sides of a single rotor 594, which in a particular embodiment is manufactured by forging. The rotor 594 may be received on a shaft 524 driven by the turbine section. Tip seals 596 (e.g. labyrinth or fin type air seals) with a low pressure "sink" (exhaust) 596 below either of the impeller delivery pressures (e.g. to ambient) are arranged at the impeller tips to prevent interference between the two compressors 520, 521 which might result in premature stall or surge, when the two sides are operating at different pressures.

FIGS. 15-16 show an alternate configuration for the compressors and turbines, which may be used in replacement of the compressor(s) and turbines of any of the auxiliary power units 10, 110, 210 described above. The supercharger compressor 620 is mounted on a separate turbocharger shaft 698 with the second stage (e.g. pressure) turbine 622, and where the first stage turbine 626 drives the bleed compressor 621 through a turbine shaft 624 and is compounded with the engine core 12' through the gearbox 28. In a particular embodiment, such a configuration allows for the turbocharger 620 to find its own match point and possibly eliminate the need for variables on one of the compressors 620, 621. Variable nozzle geometry (e.g. variable area turbine vanes 699, see FIG. 16) could be introduced on the second stage turbine 622 to improve controllability of the degree of supercharge. In a particular embodiment, such a configuration allows for the speed of the second stage turbine 622 to be selected independent of the requirements for the first stage turbine 626. As can be seen in FIG. 16, in a particular embodiment the turbocharger shaft 698 is concentric with the shaft 624 of the first stage turbine 622, and a common inlet plenum 619 is provided for both compressors 620, 621. It is understood that although the second stage turbine 622 is shown as a radial turbine, it could alternately be an axial turbine.

Size effects, material capability and cost considerations generally limit the efficiency of typical present gas turbine engine auxiliary power units. In a particular embodiment, the auxiliary power unit 10, 110, 210 including some measure of constant volume combustion aided by variable supercharging to preserve high altitude performance provides for an increase in efficiency with minimal complexity or need for sophisticated materials requirements and/or improved specific cost as compared to a traditional gas turbine engine auxiliary power unit.

Like typical auxiliary power unit installations, the auxiliary power unit 10, 110, 210 can be used to provide both medium pressure air for aircraft use and constant speed shaft power to drive a generator, for example at synchronous speed for 400 Hz. The auxiliary power unit 10, 110, 210 may be operated for air alone, electrical power alone or some combination of both types of load at the same time. Normally combined load occurs in ground or low altitude operation. In flight, at altitudes up to the aircraft ceiling, the auxiliary power unit is typically required to be operable for electrical power only, as an additional electrical power source after the main engine(s). In a particular embodiment, the present auxiliary power unit 10, 110, 210 includes variable supercharging to sustain the required power output in the less dense air at high altitude.

In a particular embodiment, the auxiliary power unit 10, 110, 210 is configured with simple inlet and exhaust connections (including main, load and cooling gas paths) to facilitate quick removal and replacement comparable to the traditional gas turbine engine auxiliary power units.

It is understood that the engine assemblies shown as auxiliary power units 10, 110, 210 may alternately be configured as other types of engine assemblies, including, but not limited to, turboshaft engine assemblies where the engine core 12' is configured as or drivingly engaged to an output shaft, and turboprop engine assemblies where the engine core 12' is drivingly engaged to a propeller.

The above description is meant to be exemplary only, and one skilled in the art will recognize that changes may be made to the embodiments described without departing from the scope of the invention disclosed. Each rotor shown may be a centrifugal or axial device, and may be replaced by two or more rotors having radial, axial or mixed flow blades. Still other modifications which fall within the scope of the present invention will be apparent to those skilled in the art, in light of a review of this disclosure, and such modifications are intended to fall within the appended claims.

The invention claimed is:

1. An engine assembly for an aircraft, the engine assembly comprising:
    a liquid-cooled internal combustion engine having a liquid coolant system;
    a heat exchanger having coolant passages in fluid communication with the liquid coolant system and air passages in heat exchange relationship with the coolant passages;
    an exhaust duct in fluid communication with the air passages of the heat exchanger, the exhaust duct having an outlet in fluid communication with an environment of the aircraft;
    an intermediate duct in fluid communication with an exhaust of the liquid-cooled internal combustion engine, the outlet of the intermediate duct spaced inwardly from a peripheral wall of the exhaust duct; and
    a fan in fluid communication with the exhaust duct configured in use for driving a cooling air flow through the air passages of the heat exchanger and into the exhaust duct at a higher mass flow than a higher mass flow of the exhaust gases, and wherein the intermediate duct has an outlet positioned within the exhaust duct downstream of the fan and upstream of the outlet of the exhaust duct.

2. The engine assembly as defined in claim 1, wherein the intermediate duct is in fluid communication with an exhaust of the liquid-cooled internal combustion engine through a turbine section including at least one turbine compounded with the liquid-cooled internal combustion engine.

3. The engine assembly as defined in claim 1, wherein the intermediate duct is concentric with the peripheral wall of the exhaust duct.

4. The engine assembly as defined in claim 1, wherein the exhaust duct is located in a tail cone of the aircraft.

5. The engine assembly as defined in claim 1, wherein the peripheral wall of the exhaust duct is made of a material selected from the group consisting of: an aluminum alloy, a composite material, and a polymer.

6. The engine assembly as defined in claim 1, wherein the air passages of the heat exchanger extend along a radial direction of the engine assembly.

7. The engine assembly as defined in claim 1, further comprising an additional heat exchanger having additional air passages in fluid communication with the exhaust duct, the additional heat exchanger having additional coolant passages in heat exchange relationship with the additional air passages and in fluid communication with a lubricating system of the liquid-cooled internal combustion engine.

8. The engine assembly as defined in claim 1, wherein a ratio of a diameter of the intermediate duct to a diameter of the exhaust duct is from 0.2 to 0.4.

9. The engine assembly as defined in claim 1, wherein the liquid-cooled internal combustion engine is a Wankel rotary engine including a rotor having three apex portions mounted for eccentric revolutions within an internal cavity defined in a housing, the internal cavity having an epitrochoid shape with two lobes.

10. The engine assembly as defined in claim 1, wherein the engine assembly is configured as an auxiliary power unit.

11. An engine assembly configured as an auxiliary power unit and received in a compartment of an aircraft, the engine assembly comprising:
    an internal combustion engine having a liquid coolant system;
    a turbine section having an inlet in fluid communication with an outlet of the internal combustion engine, the turbine section including at least one turbine compounded with the internal combustion engine;
    a heat exchanger in fluid communication with the liquid coolant system;
    an exhaust duct in fluid communication with the compartment through the heat exchanger, the exhaust duct having an outlet in fluid communication with an environment of the aircraft;
    a fan in fluid communication with the exhaust duct, the fan drivable by the internal combustion engine for driving a cooling air flow from the compartment, through the heat exchanger and into the exhaust duct; and
    an intermediate duct in fluid communication with an exhaust of the turbine section, the intermediate duct having an outlet positioned within the cooling air exhaust duct downstream of the fan and upstream of the outlet of the exhaust duct, the outlet of the intermediate duct spaced inwardly from a peripheral wall of the exhaust duct so that, in use, a flow of cooling air through the exhaust duct surrounds a flow of exhaust gases out of the intermediate duct, an open cross-sectional area of the outlet of the intermediate duct being smaller than an open cross-sectional area of the exhaust duct around the outlet of the intermediate duct, wherein the fan is drivable for driving the cooling air flow into the exhaust duct at a higher mass flow than a higher mass flow of the exhaust gases.

12. The engine assembly as defined in claim 11, wherein the intermediate duct is concentric with the peripheral wall of the exhaust duct.

13. The engine assembly as defined in claim 11, wherein the exhaust duct is located in a tail cone of the aircraft.

14. The engine assembly as defined in claim 11, wherein the peripheral wall of the exhaust duct is made of a material selected from the group consisting of: an aluminum alloy, a composite material, and a polymer.

15. The engine assembly as defined in claim 11, wherein the cooling air flows through the heat exchanger along a radial direction of the auxiliary power unit.

16. The engine assembly as defined in claim 11, further comprising an additional heat exchanger in fluid communication with a lubricating system of the internal combustion engine, the exhaust duct being in fluid communication with the compartment through the heat exchanger and the additional heat exchanger.

17. The engine assembly as defined in claim 11, wherein the internal combustion engine is a Wankel rotary engine including a rotor having three apex portions mounted for eccentric revolutions within an internal cavity defined in a housing, the internal cavity having an epitrochoid shape with two lobes.

18. The engine assembly as defined in claim 11, wherein a ratio of a diameter of the intermediate duct to a diameter of the exhaust duct is from 0.2 to 0.4.

19. A method of discharging air and exhaust gases in an auxiliary power unit having an internal combustion engine, the method comprising:
circulating a flow of cooling air used to cool a liquid coolant of the internal combustion engine to an exhaust duct of the auxiliary power unit and out of the auxiliary power unit; and
circulating a flow of exhaust gases produced by the internal combustion engine to the exhaust duct so that the flow of cooling air surrounds the flow of exhaust gases, a mass flow the exhaust gases being smaller than a mass flow of the cooling air.

20. The method as defined in claim 19, wherein the flow of exhaust gases is circulated from the internal combustion engine through a turbine section compounded with the internal combustion engine before being circulated to the exhaust duct.

21. The method as defined in claim 19, wherein the flow of exhaust gases is discharged along a central axis of the exhaust duct.

22. The method as defined in claim 19, wherein the mass flow of the exhaust gases is 20% or less of the mass flow of the cooling air.

23. The method as defined in claim 19, wherein the flow of exhaust gases has a greater velocity than the flow of cooling air.

\* \* \* \* \*